United States Patent
Kurokawa

(10) Patent No.: US 9,759,249 B2
(45) Date of Patent: Sep. 12, 2017

(54) JOINING STRUCTURE

(71) Applicant: TOYOTA JIDOSHA KABUSHIKI KAISHA, Toyota-shi (JP)

(72) Inventor: Hiroyuki Kurokawa, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/899,980

(22) PCT Filed: Jun. 24, 2014

(86) PCT No.: PCT/JP2014/066738
§ 371 (c)(1),
(2) Date: Dec. 18, 2015

(87) PCT Pub. No.: WO2015/008589
PCT Pub. Date: Jan. 22, 2015

(65) Prior Publication Data
US 2016/0138637 A1 May 19, 2016

(30) Foreign Application Priority Data
Jul. 16, 2013 (JP) .................................. 2013-147766

(51) Int. Cl.
*A47G 3/00* (2006.01)
*F16B 19/00* (2006.01)
(Continued)

(52) U.S. Cl.
CPC ............ *F16B 19/008* (2013.01); *B23K 11/00* (2013.01); *F16B 5/04* (2013.01); *F16B 5/045* (2013.01);
(Continued)

(58) Field of Classification Search
CPC .......... F16B 19/008; F16B 5/08; F16B 5/045; F16B 19/06; F16B 19/086; B23K 11/00
(Continued)

(56) References Cited

U.S. PATENT DOCUMENTS 2,230,879 A * 2/1941 Bronson ............. B29C 37/0082
152/DIG. 7
2,569,059 A * 9/1951 Huff ...................... F16B 19/008
219/107
(Continued)

FOREIGN PATENT DOCUMENTS

JP         64-53761 U     4/1989
JP         2000-272541 A  10/2000
(Continued)

OTHER PUBLICATIONS

International Preliminary Report on Patentability issued Jan. 21, 2016 in PCT/JP2014/066738 (English Translation only).
(Continued)

*Primary Examiner* — Gary Estremsky
(74) *Attorney, Agent, or Firm* — Oblon, McClelland, Maier & Neustadt, L.L.P.

(57) ABSTRACT

An occurrence of thermal distortion when heterogenous materials are joined together is suppressed. Provided is a joining structure that includes a first member, a second member, a rivet and a resin-filled portion. The first member is formed of a first material. The second member is formed of a second material that is different from the first material. The rivet penetrates through at least the first member and joins the first member and second member together. The resin-filled portion is provided around the rivet at a side of the first member at which the second member is disposed. The resin-filled portion is formed by at least one of the first member and the second member and forms a gap between
(Continued)

the first member and the second member. A resin member is disposed inside the resin-filled portion.

10 Claims, 16 Drawing Sheets

(51) Int. Cl.
| | |
|---|---|
| *B23K 11/00* | (2006.01) |
| *F16B 5/04* | (2006.01) |
| *F16B 5/08* | (2006.01) |
| *F16B 19/06* | (2006.01) |
| *F16B 19/08* | (2006.01) |
| *B62D 25/06* | (2006.01) |
| *B62D 25/20* | (2006.01) |
| *F16B 19/10* | (2006.01) |

(52) U.S. Cl.
CPC ............... *F16B 5/08* (2013.01); *F16B 19/06* (2013.01); *F16B 19/086* (2013.01); *B62D 25/06* (2013.01); *B62D 25/2036* (2013.01); *F16B 19/1054* (2013.01)

(58) Field of Classification Search
USPC ................. 411/82, 82.2; 29/525.06, 525.07; 228/120
See application file for complete search history.

(56) References Cited

U.S. PATENT DOCUMENTS

| | | | | |
|---|---|---|---|---|
| 3,481,634 | A * | 12/1969 | Rondeau | F16B 9/00 403/12 |
| 4,429,209 | A * | 1/1984 | Hinden | B23K 11/0046 219/98 |
| 7,996,975 | B1 * | 8/2011 | Denslow | F16B 5/04 29/419.1 |
| 8,029,221 | B2 * | 10/2011 | Curley, Jr. | F16B 11/006 29/525.02 |
| 2009/0294410 | A1 | 12/2009 | Iwase et al. | |

FOREIGN PATENT DOCUMENTS

| | | |
|---|---|---|
| JP | 2008-215423 A | 9/2008 |
| JP | 2009-285678 A | 12/2009 |
| JP | 2010-207898 A | 9/2010 |

OTHER PUBLICATIONS

International Search Report issued Aug. 19, 2014 in PCT/JP2014/066738 filed Jun. 24, 2014.

* cited by examiner

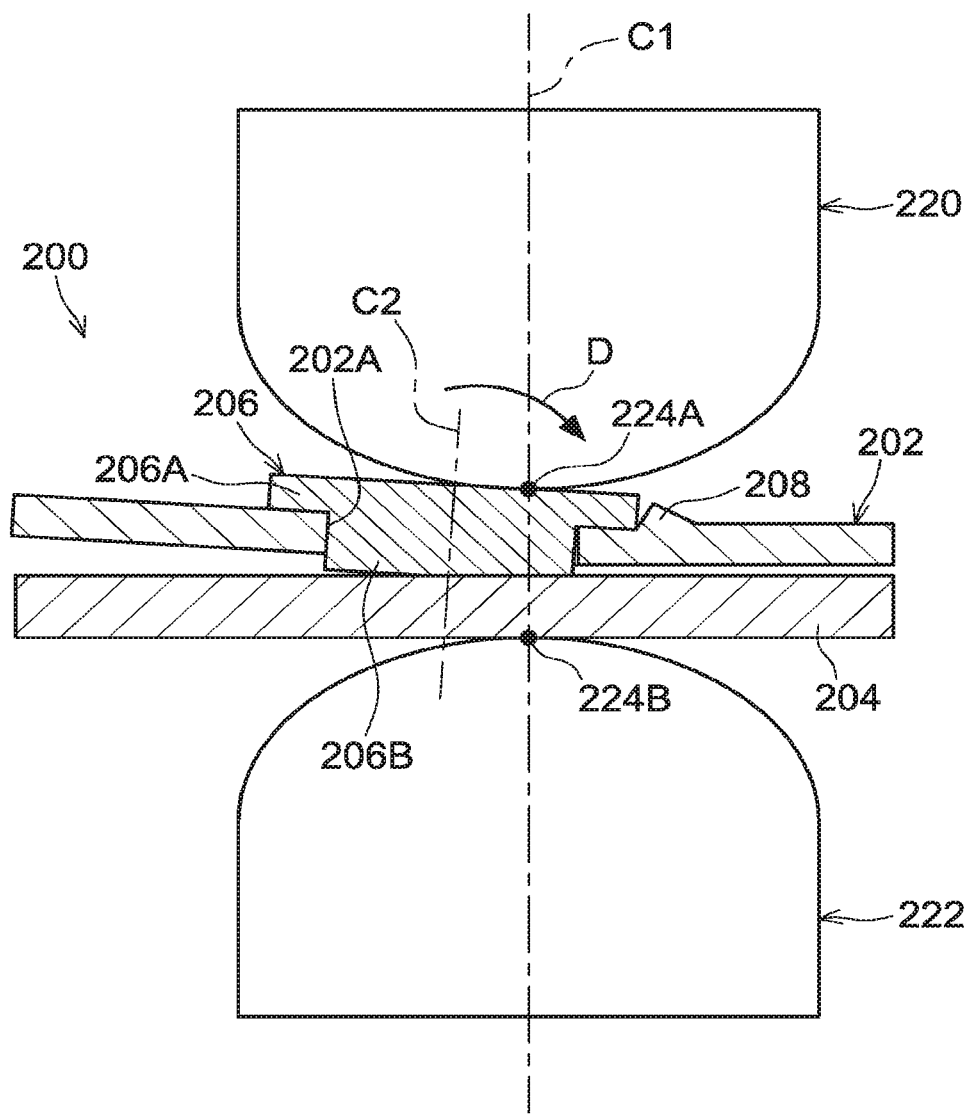

JOINING STRUCTURE

TECHNICAL FIELD

The present invention relates to a joining structure that joins heterogenous materials.

BACKGROUND ART

Patent Reference 1 (Japanese Patent Application Laid-Open (JP-A) No. 2010-207898) discloses a structure that joins a plate fabricated of steel and a plate fabricated of an aluminium alloy, which are heterogenous materials, using rivets. In this structure, in a state in which a shaft portion of a rivet penetrates through the plate fabricated of aluminium alloy and a distal end of the shaft portion of the rivet is in contact with the plate fabricated of steel, the shaft portion of the rivet and the plate fabricated of steel are joined together by spot welding.

RELATED ART REFERENCES

Patent References

Patent Document 1: Japanese Patent Application Laid-Open (JP-A) No. 2010-207898

SUMMARY OF INVENTION

Technical Problem

In the structure recited in Patent Reference 1 (JP-A No. 2010-207898), when two plates of heterogenous materials are joined by rivets, thermal distortion may occur between the two plates in a high-temperature environment.

In consideration of the circumstances described above, an object of the present invention is to provide a joining structure that may suppress occurrences of thermal distortion when heterogenous materials are joined.

Solution to Problem

A joining structure according to a first aspect of the present invention includes: a first member formed of a first material; a second member formed of a second material that is different from the first material; a rivet that penetrates through at least the first member and joins the first member and the second member together; and a resin-filled portion provided around the rivet at a side of the first member at which the second member is disposed, the resin-filled portion being formed by at least one of the first member and the second member and forming a gap between the first member and the second member, and a resin member being disposed inside the resin-filled portion, the second material is formed of a metal material, the rivet includes a head portion that touches the first member and a shaft portion that penetrates through the first member, and the shaft portion is joined to the second member by welding.

In a joining structure according to a second aspect of the present invention, in the joining structure according to the first aspect, another resin-filled portion is provided around the rivet at an opposite side of the first member from the side thereof at which the second member is disposed, a resin member being disposed inside the another resin-filled portion.

In a joining structure according to a third aspect of the present invention, in the joining structure according to the first aspect or the second aspect, the second member is formed of a material with a lower linear expansion coefficient than the first member.

In a joining structure according to a fourth aspect of the present invention, in the joining structure according to any one of the first to third aspects, the resin member that is disposed in the resin-filled portion is an adhesive.

In a joining structure according to a fifth aspect of the present invention, in the joining structure according to the second aspect, a flange portion that is inflected from a wall portion of the first member is joined to the second member by the rivet, the another resin-filled portion is formed by a bead portion at the flange portion, and the bead portion is provided as far as a boundary region of the flange portion with the wall portion.

In a joining structure according to a sixth aspect of the present invention, in the joining structure according to any one of the first to fifth aspects, another bead portion is provided so as to connect between a plurality of the rivet, the another bead portion being in fluid communication with the resin-filled portion.

In a joining structure according to an eighth aspect of the present invention, in the joining structure according to the first aspect or the fourth aspect, at least two protrusion portions are provided at a surface of the rivet that opposes the second member, the protrusion portions protruding toward the second member.

In a joining structure according to a ninth aspect of the present invention, in the joining structure according to the eighth aspect, a recess portion is provided at the surface of the rivet that opposes the second member, the recess portion being provided at a location adjacent to the protrusion portions, the recess portion being sunken in a direction away from the second member.

In a joining structure according to a tenth aspect of the present invention, in the joining structure according to the eighth aspect or the ninth aspect, the protrusion portions are provided at a central portion and a periphery edge portion of the surface of the rivet that opposes the second member.

In a joining structure according to a twelfth aspect of the present invention, in the joining structure according to the first aspect, a trough portion is provided at the head portion, the trough portion being provided at a location adjacent to the shaft portion, the trough portion being sunken in a direction away from the second member.

According to the joining structure of the first aspect of the present invention, the first member formed of the first material and the second member formed of the second material that is different from the first material are joined by the rivet that penetrates through at least the first member. Around the rivet, at the side of the first member at which the second member is disposed, the resin-filled portion is formed by one or both of the first member and the second member. Thus, the gap is formed between the first member and the second member by the resin-filled portion, and the resin member is disposed inside the resin-filled portion.

Ordinarily, when a first member and second member that have different linear expansion coefficients are joined by a rivet, thermal distortion is likely to occur between the first member and the second member in a high-temperature environment because of the difference in linear expansion coefficients. However, in the joining structure of the present aspect, because the resin member is disposed inside the resin-filled portion, thermal distortion due to the difference in linear expansion coefficients between the first member and the second member is absorbed by the resin member. Therefore, an occurrence of thermal distortion between the first member and the second member in a high-temperature environment may be suppressed.

The second material is formed of the metal material, the head portion of the rivet is in contact with the first member, and the shaft portion of the rivet penetrates through the first member and is joined to the second member by welding. Here, because the gap is formed between the first member and the second member by the resin-filled portion, current-splitting of electric current when the shaft portion of the rivet and the second member are being welded may be suppressed and weld strength between the rivet and the second member may be assured.

According to the joining structure of the second aspect of the present invention, the another resin-filled portion, at the interior of which a resin member is disposed, is provided around the rivet at the opposite side of the first member from the side thereof at which the second member is disposed. Because the resin member is disposed inside the another resin-filled portion, an occurrence of corrosion due to electrochemical corrosion between the first member and the rivet may be suppressed.

According to the joining structure of the third aspect of the present invention, because the second member is formed of a material with a lower linear expansion coefficient than the first member, forming the resin-filled portion in the first member is easier than in a case of forming the resin-filled portion in the second member.

According to the joining structure of the fourth aspect of the present invention, the resin member disposed in the resin-filled portion is an adhesive. Thus, the first member and second member are adhered by this adhesive. In this case, because a more uniform thickness of adhesive may be assured by the resin-filled portion, adhesion strength may be improved.

According to the joining structure of the fifth aspect of the present invention, the flange portion inflected from the wall portion of the first member is joined to the second member by the rivet, the another resin-filled portion is formed by the bead portion of the flange portion, and the bead portion is provided as far as the boundary region of the flange portion with the wall portion. Because the bead portion is formed at the flange portion, stiffness and strength of a joining surface of the flange portion that is joined by the rivet may be improved. Thus, occurrences of thermal distortion due to the difference in linear expansion coefficients between the first member and the second member may be more effectively suppressed.

According to the joining structure of the sixth aspect of the present invention, the another bead portion is provided so as to be in fluid communication with the resin-filled portion and connect between the plural rivets. Therefore, strength and stiffness between the joining rivets may be improved and occurrences of thermal distortion due to the difference in linear expansion coefficients between the first member and the second member may be more effectively suppressed. Furthermore, because the another bead portion is in fluid communication with the resin-filled portion, the resin member stays in the another bead portion when the first member and second member are being joined. Therefore, extrusion of the resin member from between the first member and the second member may be suppressed, and a sealing effect may be improved.

According to the joining structure of the eighth aspect of the present invention, the at least two protrusion portions protruding towards the second member are provided at the surface of the rivet that opposes the second member. Therefore, when the rivet and the second member are being joined by welding or the like, melting starts from the at least two protrusion portions. Therefore, an occurrence of a joining failure between the rivet and the second member in association with local unevenness of heat at a single spot may be suppressed.

According to the joining structure of the ninth aspect of the present invention, the recess portion that is sunken in the direction away from the second member is provided in the surface of the rivet that opposes the second member, at a location that is adjacent to one of the protrusion portions. Hence, when the rivet and the second member are being joined by welding or the like, a molten portion of the protrusion portion flows into the recess portion. Consequently, a welding area between the rivet and the second member may be enlarged.

According to the joining structure of the tenth aspect of the present invention, the protrusion portions are provided at the central portion and the periphery edge portion of the surface of the rivet that opposes the second member. Thus, the rivet and the second member may be joined more stably.

The second material is formed of the metal material, the head portion of the rivet is in contact with the first member, and the shaft portion of the rivet penetrates through the first member and is joined to the second member by welding. Here, because the at least two protrusion portions protruding towards the second member are provided at the surface of the rivet that opposes the second member, an occurrence of a joining failure between the rivet and the second member in association with local unevenness of heat at a single spot may be suppressed.

According to the joining structure of the twelfth aspect of the present invention, the trough portion that is sunken in the direction away from the second member is provided at the head portion of the rivet, at the location that is adjacent to the shaft portion. Therefore, when the shaft portion of the rivet is penetrating through the first member due to being driven in, a recessed trough may be formed at the side of the first member that opposes the second member by a portion of the first member entering into the trough portion of the rivet. Consequently, when the shaft portion of the rivet and the second member are being welded, regions into which molten portions of the rivet enter may be increased. Thus, the rivet and the second member may be joined more reliably.

Advantageous Effects of Invention

According to the joining structure of the present invention, occurrences of thermal distortion when heterogenous materials are joined may be suppressed.

BRIEF DESCRIPTION OF DRAWINGS

FIG. 16 is a sectional view showing the vicinity of the joining portion at which the first panel and second panel are joined by the rivet, at which the joining structure in accordance with the comparative example is employed, showing a state after the joining.

DESCRIPTION OF EMBODIMENTS

First Exemplary Embodiment

Herebelow, a first exemplary embodiment of the joining structure according to the present invention is described using FIG. 1 to FIG. 5. An arrow FR that is shown as appropriate in these drawings indicates a vehicle front side, an arrow UP indicates a vehicle upper side, and an arrow OUT indicates a vehicle width direction outer side.

Figure 1:
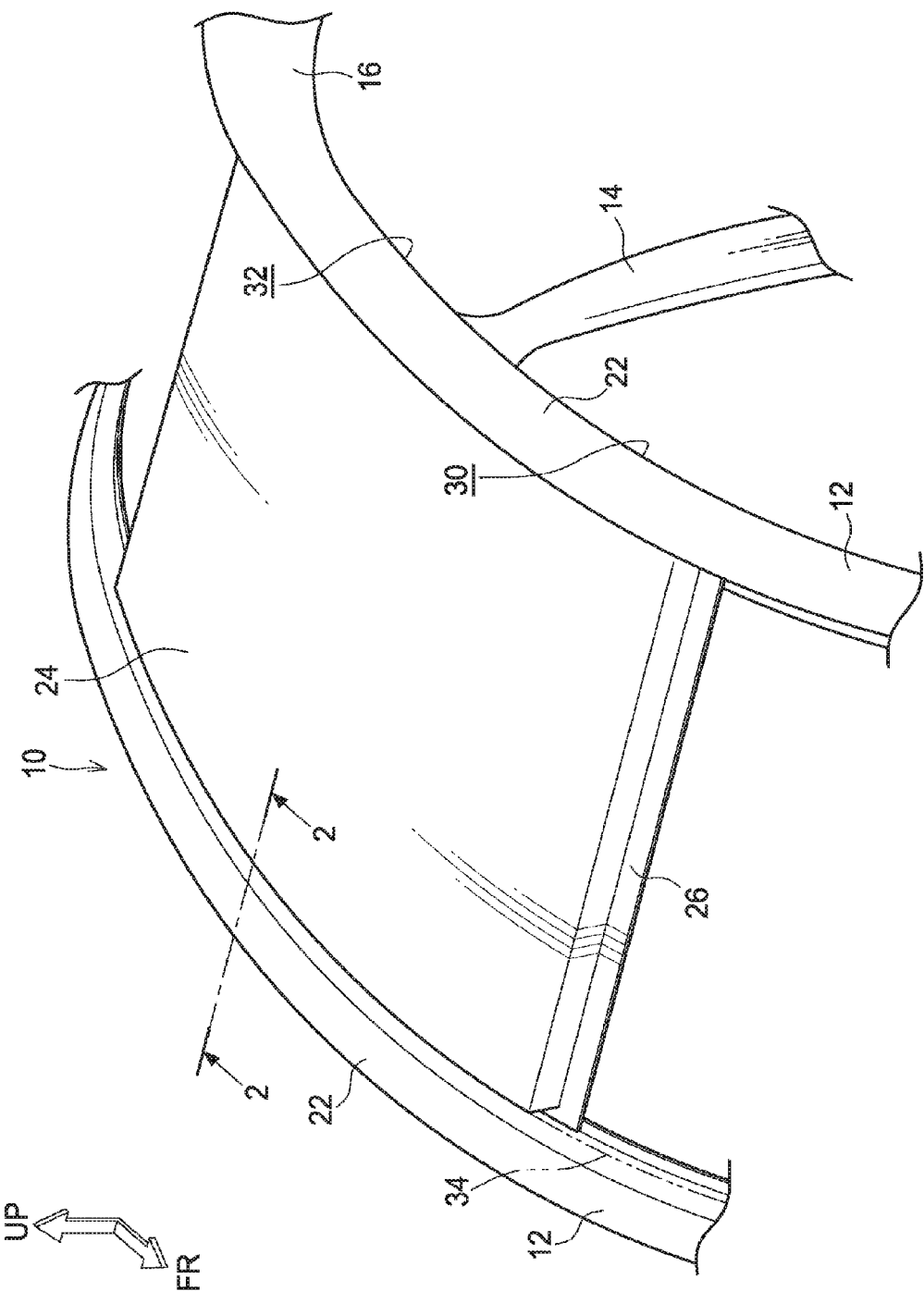
FIG. 1 is a perspective view showing an upper portion of a vehicle in which a joining structure in accordance with a first exemplary embodiment is employed.

FIG. 1 shows, in a perspective view, an upper portion of a vehicle 10 in which the joining structure according to the present exemplary embodiment is employed. As shown in FIG. 1, a front pillar 12, a center pillar 14 and a rear pillar 16 are disposed at a side portion of the vehicle 10, in this order from the vehicle front side. The front pillar 12, the center pillar 14 and the rear pillar 16 are provided in left and right pairs at both sides of the vehicle 10. A pair of left and right roof side rails 22 that extend substantially in the vehicle front-and-rear direction are provided at both sides of an upper portion of the vehicle 10, at upper sides of the front pillars 12, center pillars 14 and rear pillars 16.

A roof panel 24 is provided at the upper portion of the vehicle 10, spanning between the pair of left and right roof side rails 22. The roof panel 24 extends substantially in the vehicle width direction and substantially in the vehicle front-and-rear direction. A front roof header 26 and a rear roof header (not shown in the drawings) are provided at the upper portion of the vehicle 10, at a front end portion and a rear end portion of the roof panel 24. The front roof header 26 connects between front end portions of the roof side rails 22. The rear roof header connects between rear end portions of the roof side rails 22.

Each roof side rail 22 is respectively joined to upper end portions of the front pillar 12, the center pillar 14 and the rear pillar 16. The roof side rail 22 is a vehicle framework member disposed with a length direction thereof substantially in the vehicle front-and-rear direction. The roof side rail 22 is formed to be curved such that, in a vehicle side view, the height of a vehicle front-and-rear direction central portion thereof is higher than the heights of the two vehicle front-and-rear direction end portions thereof. A front side door opening 30 and a rear side door opening 32 are provided in the side portion of the vehicle 10, at the lower side of the roof side rail 22. The front side door opening 30 is formed at the vehicle front side of the center pillar 14 and the rear side door opening 32 is formed at the vehicle rear side of the center pillar 14. A windshield glass 34 is provided at the vehicle front side of the roof panel 24, between the front pillars 12.

Figure 2:
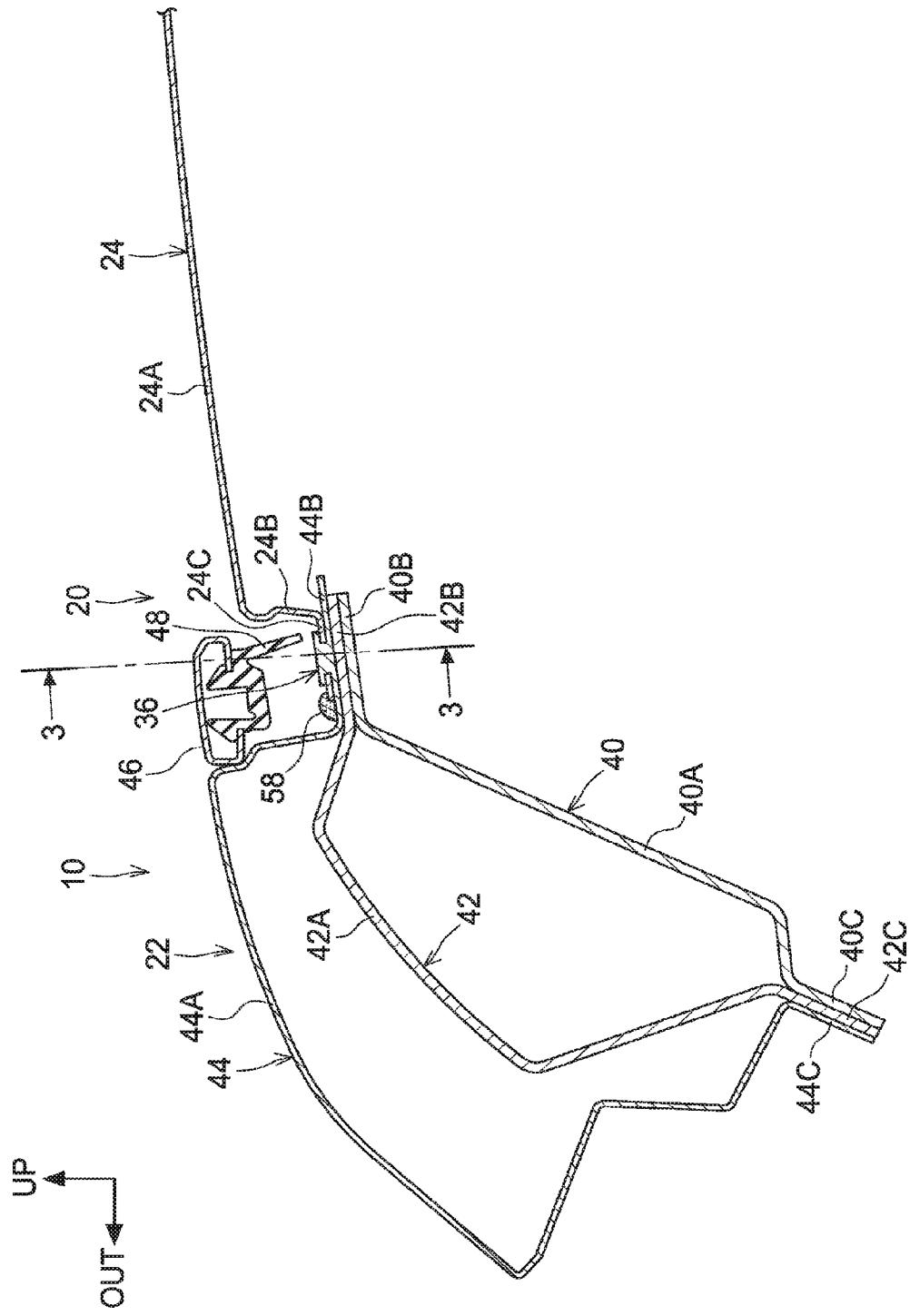
FIG. 2 is a sectional view showing a vicinity of a rivet at the upper portion of the vehicle, taken along line 2-2 in FIG. 1.
Figure 3:
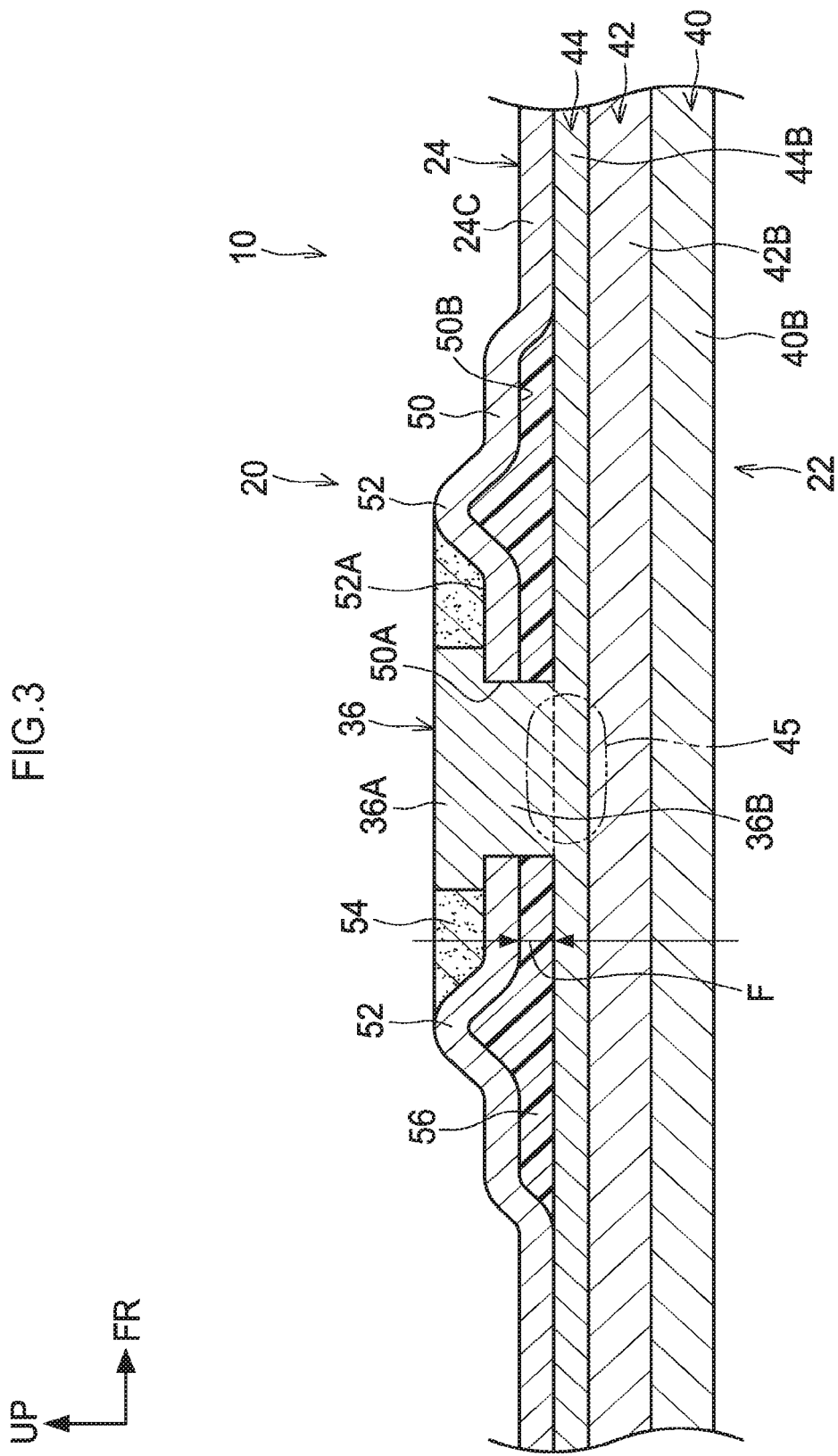
FIG. 3 is a sectional view showing a joining portion at which a roof panel and a roof side rail are joined by the rivet, taken along line 3-3 in FIG. 2.

FIG. 2 shows, in a sectional view taken along line 2-2 in FIG. 1, the upper portion of the vehicle 10. FIG. 3 shows, in a sectional view taken along line 3-3 in FIG. 2, a joining structure 20 at the upper portion of the vehicle 10. As shown in FIG. 2 and FIG. 3, the joining structure 20 according to the present exemplary embodiment is provided with the roof side rail 22, the roof panel 24 and a rivet 36. The roof side rail 22 is provided with a side panel outer 44, which serves as a second member. The roof panel 24 spanning between the roof side rails 22 serves as a first member. The rivet 36 joins a vehicle width direction inner side end portion of the roof side rail 22 with a vehicle width direction outer side end portion of the roof panel 24.

As shown in FIG. 2, the roof side rail 22 is provided with a roof rail inner 40 disposed at the vehicle width direction inner side, a roof rail reinforcement (the second member) 42 and the side panel outer (the second member) 44. The roof rail reinforcement 42 is disposed at the vehicle width direction outer side of the roof rail inner 40. The side panel outer 44 is disposed at the vehicle width direction outer side of the roof rail reinforcement 42. The roof rail inner 40 is provided with an inflection portion 40A, a flange portion 40B and a flange portion 40C. In a vehicle front view, a vehicle width direction central portion of the inflection portion 40 is inflected substantially in an "L" shape. The flange portion 40B extends to the vehicle width direction inner side from an upper end portion at the vehicle inner side of the inflection portion 40A. The flange portion 40C extends diagonally to the vehicle lower side from a lower end portion at the vehicle outer side of the inflection portion 40A.

The roof rail reinforcement 42 is provided with a protruding portion 42A, a flange portion 42B and a flange portion 42C. The protruding portion 42A is formed so as to protrude in a protruding shape to the vehicle width direction outer side. The flange portion 42B extends to the vehicle width direction inner side from a vehicle inner side end portion of the protruding portion 42A. The flange portion 42C extends diagonally to the vehicle lower side from a vehicle outer side end portion of the protruding portion 42A. The side panel outer 44 is provided with a protruding portion 44A, a flange portion 44B and a flange portion 44C. The protruding portion 44A is formed so as to protrude to the vehicle width direction outer side, so as to cover the protruding portion 42A of the roof rail reinforcement 42. The flange portion 44B extends to the vehicle width direction inner side from a vehicle inner side end portion of the protruding portion 44A. The flange portion 44C extends diagonally to the vehicle lower side from a lower end portion of the protruding portion 44A.

In a state in which the flange portions 40B, 42B and 44B at the vehicle inner side are superposed in this order from the vehicle lower side and the flange portions 40C, 42C and 44C at the vehicle outer side are superposed, the roof rail inner 40, roof rail reinforcement 42 and side panel outer 44 are joined by welding of the respective flange portions. The flange portions 40B, 42B and 44B at the vehicle inner side are disposed in a substantially horizontal direction in the vehicle front view.

The roof panel 24 is provided with a general portion 24A, a vertical wall portion 24B and a flange portion 24C. The general portion 24A extends substantially in the vehicle width direction and substantially in the vehicle front-and-rear direction. The vertical wall portion 24B is a wall portion that extends substantially to the vehicle lower side from a vehicle width direction outer side end portion of the general portion 24A. The flange portion 24C extends substantially to the vehicle width direction outer side from a lower end portion of the vertical wall portion 24B. In a state in which a lower face of the flange portion 24C of the roof panel 24 is disposed on an upper face of the flange portion 44B of the side panel outer 44, the flange portion 24C and the flange portion 44B are joined together by the rivet 36.

More specifically, a gutter portion is formed between a vehicle inner side end portion of the protruding portion 44A of the side panel outer 44 and the vertical wall portion 24B of the roof panel 24. The flange portion 24C and flange portion 44B are disposed at a floor face of the gutter portion and joined together by the rivet 36. A gap-filling member 46 is provided at the upper side of the rivet 36 so as to cover the gutter portion between the vehicle inner side end portion of the protruding portion 44A of the side panel outer 44 and the vertical wall portion 24B of the roof panel 24. A lip member 48 is attached to the gap-filling member 46. The lip member 48 is suspended above the rivet 36.

The roof panel 24 has a large area and little influence on strength in relation to collisions, durability and the like. Therefore, the roof panel 24 is formed of a lightweight material (a material such as a carbon fiber-reinforced plastic (CFRP), an aluminium alloy, a magnesium alloy or the like). In the present exemplary embodiment, the roof panel 24 is formed of an aluminium alloy (a first material).

The roof side rail 22 is a framework member and requires strength in relation to collisions, durability and the like. Therefore, the roof side rail 22 is formed of steel plate, which serves as an example of a metal material (a second material). That is, the side panel outer 44, roof rail reinforcement 42 and the like structuring the roof side rail 22 are formed of the second material (steel plate) that is different from the first material constituting the roof panel 24. In the present exemplary embodiment, the side panel outer 44, roof rail reinforcement 42 and the like structuring the roof side rail 22 are formed of a material with a lower linear expansion coefficient than the material that constitutes the roof panel 24.

In the vehicle 10, effects of reducing fuel consumption and exhaust gases by reducing vehicle body weight, improving handling stability by reducing the weight of components of the vehicle 10, and so forth are sought by employing the roof panel 24 that is formed of a lightweight material. In particular, because the roof panel 24 is a component that is at a higher position than the height of the center of gravity of the vehicle 10, there is a large effect of improving handling stability. It is thought that cases in which heavy steel plate is replaced with a lightweight material, such as a CFRP, an aluminium alloy or the like, in the roof panel 24, which has a large area and little effect on strength in relation to collisions, durability and the like, will become more numerous in the future. In these cases, the heterogenous materials of the roof panel 24 and the roof side rail 22 (the side panel outer 44 or the like) are to be joined.

In the joining structure 20 according to the present exemplary embodiment, the rivet 36 is fabricated of steel, the same as the material that constitutes the side panel outer 44. The material of the rivet 36 is not limited thus; the rivet 36 may be formed of a material that is different from the material that constitutes the side panel outer 44. As shown in FIG. 3, the rivet 36 is provided with a head portion 36A and a shaft portion 36B. In the present exemplary embodiment, the head portion 36A is formed in a substantially circular shape (see FIG. 4).

Figure 4:
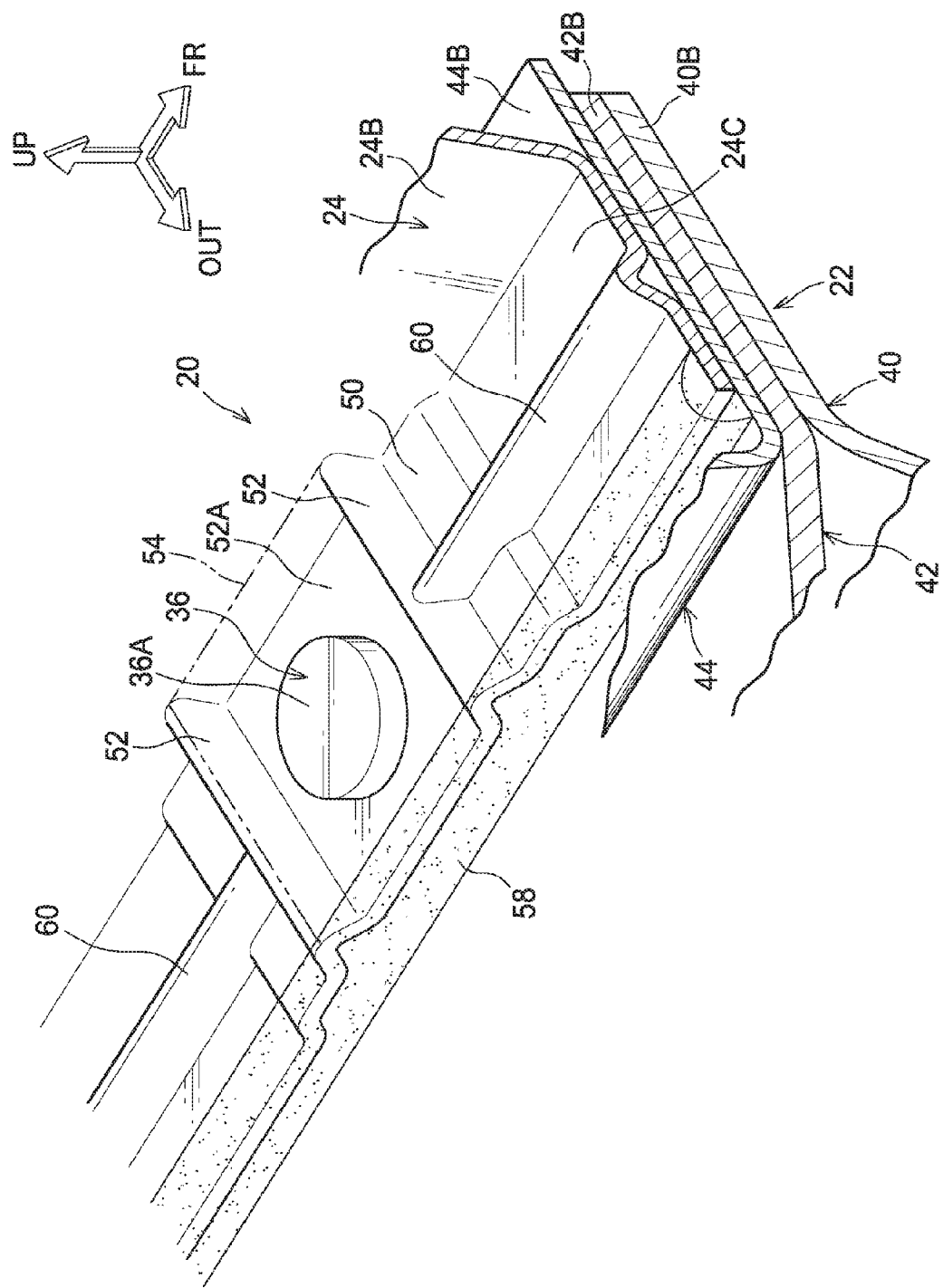
FIG. 4 is a perspective view showing the joining portion at which the roof panel and the roof side rail are joined by the rivet, in a state in which the joining portion is viewed from the vehicle upper side thereof.

As shown in FIG. 3 and FIG. 4, a seat portion 50 is provided at the flange portion 24C of the roof panel 24 in order to form a gap between the flange portion 24C and the flange portion 44B of the side panel outer 44. The seat portion 50 protrudes to the opposite side of the flange portion 24C from the side thereof at which the flange portion 44B is disposed. The seat portion 50 is formed in a substantially rectangular shape in a vehicle plan view. The seat portion 50 is provided in a range from a vehicle width direction outer side end portion of the flange portion 24C to a boundary region between the flange portion 24C and the vertical wall portion 24B (see FIG. 4).

A penetrating hole 50A is formed in the seat portion 50 of the roof panel 24. The shaft portion 36B of the rivet 36 penetrates through the penetrating hole 50A. Two bead portions 52 are formed at the upper portion side of the seat portion 50 (the opposite side of the seat portion 50 from the side thereof at which the side panel outer 44 is disposed), at the vehicle front side and the vehicle rear side of the penetrating hole 50A. The bead portions 52 protrude to the vehicle upper side in substantially triangular shapes (inverted "V" shapes). The two bead portions 52 are formed along the vehicle width direction in the range from the vehicle width direction outer side end portion of the flange portion 24C to the vertical wall portion 24B. A resin-filled portion 52A is provided in a region of the upper portion side of the seat portion 50 that is sandwiched by the two bead portions 52. The resin-filled portion 52A serves as another resin-filled portion, inside which a sealant 54 that serves as a resin member is disposed. The resin-filled portion 52A is formed as a recess portion sandwiched by the two bead portions 52.

Thus, in the state in which the shaft portion 36B of the rivet 36 penetrates through the penetrating hole 50A of the seat portion 50 of the roof panel 24, the sealant 54 is applied to the resin-filled portion 52A around the head portion 36A of the rivet 36. Because the sealant 54 is applied around the head portion 36A of the rivet 36 inside the resin-filled portion 52A, occurrences of corrosion due to electrochemical corrosion between the rivet 36 fabricated of steel and the seat portion 50 of the roof panel 24 fabricated of aluminium alloy are suppressed.

The cross-sectional shape of each bead portion 52 is not limited to a substantially triangular shape; a shape such as a semi-circle, a trapezoid or the like may be selected. The height of each bead portion 52 must be set to be at least higher than a height of the head portion 36A of the rivet 36 in consideration of the application of the sealant 54.

At the lower portion side of the seat portion 50 of the roof panel 24 (the side thereof at which the side panel outer 44 is disposed), a gap F is formed and a resin-filled portion 50B in a recess shape is provided. The gap F is formed between the flange portion 24C and the flange portion 44B of the side panel outer 44. An adhesive 56 that serves as a resin member is disposed inside the resin-filled portion 50B. An adhesive for construction applications may be employed as the adhesive 56. The seat portion 50 of the roof panel 24 and the flange portion 44B of the side panel outer 44 are adhered together by the adhesive 56. Hence, the adhesive 56 stays rather than being extruded from the seat portion 50. Consequently, occurrences of corrosion due to electrochemical corrosion between the roof panel 24 and the side panel outer 44 are suppressed by the adhesive 56.

The flange portion 44B of the side panel outer 44 that is formed of steel plate and the flange portion 24C of the roof panel 24 that is formed of a lightweight material different from steel plate (a heterogenous material) may not be directly joined together by spot welding (resistance welding).

In the joining structure 20 according to the present exemplary embodiment, the shaft portion 36B of the rivet 36 penetrates through the penetrating hole 50A of the seat portion 50 of the roof panel 24 and the distal end of the shaft portion 36B of the rivet 36 is put into contact with the upper face of the flange portion 44B of the side panel outer 44. At this time, the shaft portion 36B of the rivet 36 is caused to penetrate through the penetrating hole 50A of the seat portion 50 of the roof panel 24 by being driven in by a press or the like. Then, the distal end of the shaft portion 36B of the rivet 36, the flange portion 44B of the side panel outer 44 and the flange portion 42B of the roof rail reinforcement 42 are joined by spot welding. Thus, a state is produced in which the shaft portion 36B of the rivet 36 and the flange portion 44B of the side panel outer 44 are joined together and the head portion 36A of the rivet 36 is in contact with the seat portion 50.

In this case, although not shown in the drawings, an upper side spot welding gun (electrode) is applied to an upper face of the head portion 36A of the rivet 36 and a lower side spot welding gun (electrode) is applied to a lower face of the flange portion 42B of the roof rail reinforcement 42 at the vehicle lower side of the rivet 36. At this time, the upper side spot welding gun (electrode) and lower side spot welding gun (electrode) are disposed such that up-and-down direction axes thereof substantially coincide. In this state, due to current flowing through the upper side spot welding gun (electrode) and lower side spot welding gun (electrode), a weld nugget 45 that extends between the shaft portion 36B of the rivet 36, the flange portion 44B of the side panel outer 44 and the flange portion 42B of the roof rail reinforcement 42 is formed and the same are joined together.

Because the gap F is formed between the seat portion 50 of the roof panel 24 and the flange portion 44B of the side panel outer 44, splitting of the electric current during the spot welding is suppressed. Therefore, the spot welding between the shaft portion 36B of the rivet 36 and the roof side rail 22 (the flange portion 44B of the side panel outer 44 and the flange portion 42B of the roof rail reinforcement 42) is reliably performed with substantially uniform weld strength.

Because the two bead portions 52 are formed at the seat portion 50 of the roof panel 24 from the vehicle width direction outer side end portion of the flange portion 24C to the boundary region with the vertical wall portion 24B, the stiffness and strength of the seat portion 50 at which the rivet 36 is attached may be improved. As a result, thermal distortion in a high-temperature environment due to the difference in linear expansion coefficients between the roof panel 24 formed of the lightweight material and the roof side rail 22 (the side panel outer 44 and the like) formed of steel plate is suppressed.

A sealant 58 is applied along the vehicle front-and-rear direction (see FIG. 2 and FIG. 4) between the vehicle width direction outer side end portion of the flange portion 24C of the roof panel 24 and the flange portion 44B of the side panel outer 44. Because the sealant 58 is applied, occurrences of corrosion due to electrochemical corrosion between the vehicle width direction outer side end portion of the flange portion 24C of the roof panel 24 and the flange portion 44B of the side panel outer 44 are suppressed.

Figure 5:
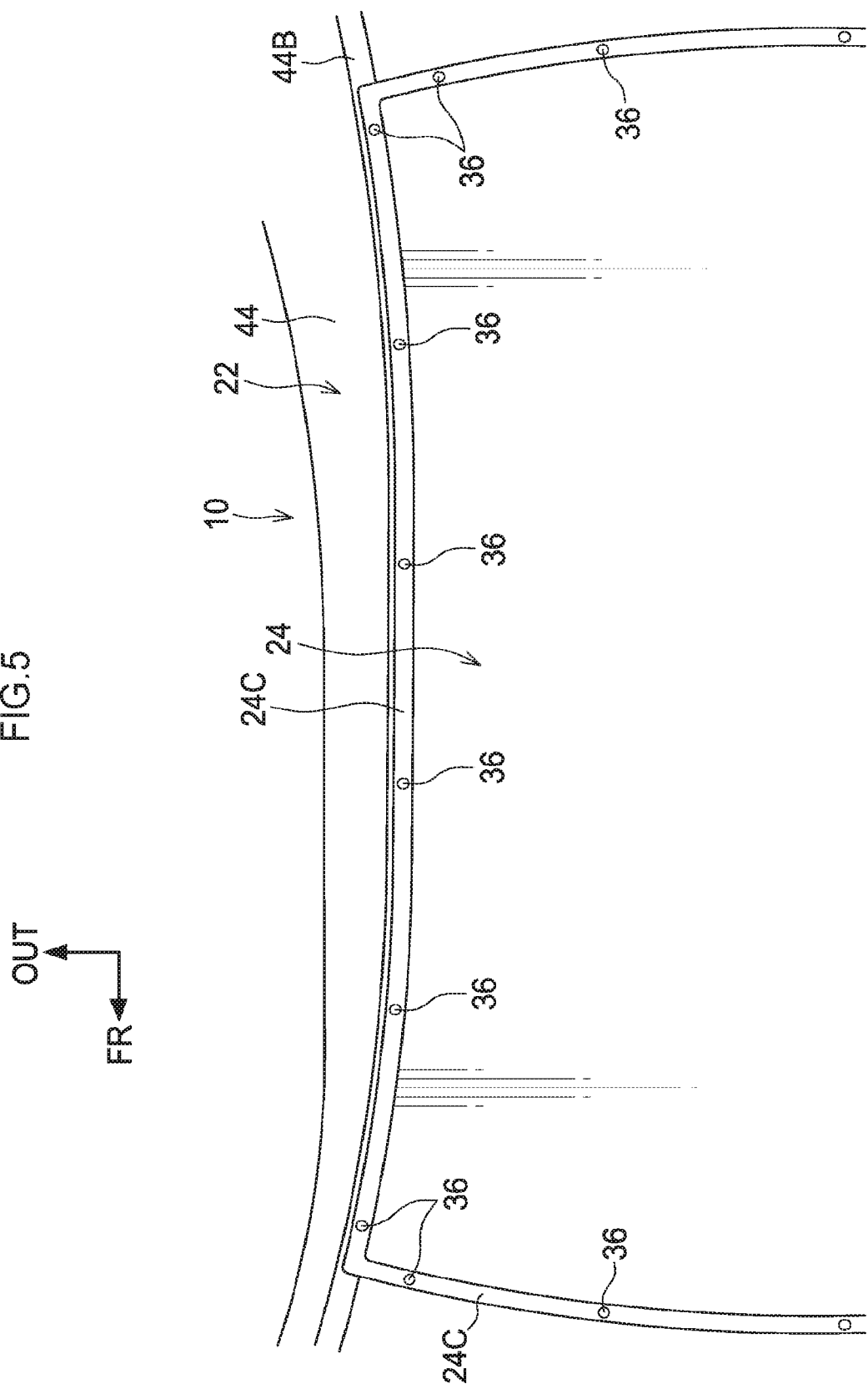
FIG. 5 is a plan view showing the roof of the vehicle.

As shown in FIG. 5, the rivet 36 is provided plurally at the flange portion 24C of the roof panel 24, spaced apart in the vehicle front-and-rear direction and the vehicle width direction. Bead portions 60 are provided at the flange portion 24C of the roof panel 24 (see FIG. 4) between adjacent rivets 36 of the plural rivets 36. Each bead portion 60 is provided so as to connect between the bead portion 52 at the side of one of the rivets 36 with the bead portion 52 at the side of another of the rivets 36. The bead portion 60 protrudes to the vehicle upper side and serves as another bead portion. The bead portion 60 is in fluid communication with the resin-filled portion 50B at the lower portion side of the seat portion 50. In the present exemplary embodiment, the bead portion 60 is formed in a substantially triangular shape, but this is not limiting. A shape such as a semi-circle, a trapezoid or the like may be selected.

Because each bead portion 60 is provided so as to connect between the adjacent rivets 36, strength and stiffness between the joining rivets 36 may be improved. As a result, thermal distortion in a high-temperature environment due to the difference in linear expansion coefficients between the roof panel 24 formed of the lightweight material and the roof side rail 22 (the side panel outer 44 and the like) formed of steel plate may be suppressed.

Because the bead portions 60 are in fluid communication with each resin-filled portion 50B, when the seat portion 50 of the roof panel 24 and the flange portion 44B of the side panel outer 44 are adhered by the adhesive 56 in the resin-filled portion 50B, excess adhesive 56 enters into the bead portions 60. Therefore, extrusion of the adhesive 56 from between the seat portion 50 of the roof panel 24 and the flange portion 44B of the side panel outer 44 is suppressed.

In the present exemplary embodiment, the roof panel 24 is formed of an aluminium alloy but may instead be formed of a magnesium alloy, a CFRP or the like. If the roof panel 24 is formed of a CFRP, a fiber orientation direction of the carbon fibres (CF) may be controlled at a time of molding (i.e., controlled by adjustment of the position of an injection gate, the setting direction of a fiber sheet, or the like). For example, the fiber orientation direction of the CF may be set to a length direction between the joining rivet 36 and the next rivet 36, as a result of which reinforcement strength may be interactively improved.

Now, a fabrication method of the joining structure 20 according to the present exemplary embodiment is described.

First, in a press-forming step, the rivet 36 is driven into the seat portion 50 of the flange portion 24C of the roof panel 24 formed of the lightweight material. Alternatively, after press-forming of the roof panel 24, the rivet 36 may be driven into the roof panel 24 in a step in which a driving tool is wielded by a robot.

In a body welding step, the body frame is assembled by welding. Accordingly, the roof side rails 22 of the vehicle 10 are assembled.

The adhesive 56 is applied to the lower face of each seat portion 50 of the flange portion 24C of the roof panel 24. Alternatively, the adhesive 56 may be applied to the upper face of the flange portion 44B of the side panel outer 44. At this time, the adhesive 56 is applied such that the adhesive 56 stays inside the resin-filled portion 50B and the bead portions 52 of the seat portion 50 and inside the bead portions 60.

Thereafter, the flange portion 24C of the roof panel 24 is set on the roof side rail 22 (on the upper face of the flange portion 44B of the side panel outer 44). Targeting a central position of the rivet 36, the upper side spot welding gun is abutted against the head portion 36A of the rivet 36 and the lower side spot welding gun is abutted against the lower face of the flange portion of the roof side rail 22, and the spot welding is implemented.

The welding is completed, the body is conveyed to a painting process, and electrodeposition painting is implemented. In a drying and baking step of the electrodeposition painting, the adhesive 56 is completely cured.

Thereafter, the sealant 54 is applied to the resin-filled portion 52A around the head portion 36A of each rivet 36, and the sealant 58 is applied to the end portion of the flange portion 24C of the roof panel 24. At this time, for the application to be performed assuredly, a worker operation is carried out to make the sealant 54 and the sealant 58 flat with a spatula or suchlike. Thereafter, painting steps for an intermediate coat and an overcoat are implemented.

Now, operation and effects of the present exemplary embodiment are described.

In the joining structure 20 according to the present exemplary embodiment, the shaft portion 36B of the rivet 36 penetrates through the seat portion 50 of the roof panel 24, and the distal end of the shaft portion 36B of the rivet 36 is joined to the flange portion 44B of the roof rail outer 44 and the like of the roof side rail 22 by spot welding. The resin-filled portion 52A is formed by the two bead portions 52 at the upper portion side of the seat portion 50 of the roof panel 24, around the head portion 36A of the rivet 36, and the sealant 54 is applied into the resin-filled portion 52A.

At the lower portion side of the seat portion 50 of the roof panel 24, the resin-filled portion 50B is formed around the rivet 36 by the seat portion 50 that protrudes to the opposite side of the roof panel 24 from the side thereof at which the flange portion 44B of the side panel outer 44 is disposed. Therefore, the gap F is formed between the seat portion 50 and the flange portion 44B of the side panel outer 44, and the adhesive 56 constituted by the resin member is applied into the resin-filled portion 50B. Thus, the seat portion 50 and the flange portion 44B of the side panel outer 44 are adhered by the adhesive 56.

Ordinarily, when a roof panel and roof side rail that have different linear expansion coefficients are joined together by a rivet, thermal distortion between the roof panel and the roof side rail is likely to occur in a high-temperature environment because of the difference in linear expansion coefficients. Thus, when a panel of an aluminium alloy, CFRP or the like is joined to a framework member formed of steel plate, thermal distortion is likely to occur because of the difference in linear expansion coefficients. In particular, this effect is most significant in accordance with a baking temperature in a painting process. Thermal distortion is particularly likely to occur when a heterogenous material contains a resin.

However, in the joining structure 20 according to the present exemplary embodiment, because the seat portion 50 of the roof panel 24 and the flange portion 44B of the side panel outer 44 are adhered by the adhesive 56 inside the resin-filled portion 50B, thermal distortion due to the difference in linear expansion coefficients between the roof panel 24 and the side panel outer 44 is absorbed by the adhesive 56. Therefore, an occurrence of thermal distortion between the roof panel 24 and the side panel outer 44 in a high-temperature environment may be suppressed.

The two bead portions 52 that form the resin-filled portion 52A are provided at the flange portion 24C of the roof panel 24 as far as the vertical wall portion 24B of the roof panel 24. Therefore, the stiffness and strength of a joining surface of the flange portion 24C at which the rivet 36 is attached may be improved, and an occurrence of thermal distortion in a high-temperature environment due to the difference in linear expansion coefficients between the roof panel 24 and the roof side rail 22 may be more assuredly suppressed.

The bead portions 60 are provided at the flange portion 24C of the roof panel 24 so as to connect between the adjacent rivets 36. Thus, strength and stiffness between the joining rivets 36 may be improved. Therefore, an occurrence of thermal distortion in a high-temperature environment due to the difference in linear expansion coefficients between the roof panel 24 and the roof side rail 22 may be more assuredly suppressed. In particular, there is a high temperature in a painting process, but an occurrence of an up-and-down direction opening deformation between the roof panel 24 and the side panel outer 44, between the joining rivet 36 and the rivet 36 that is disposed next along the length direction of the roof panel 24, may be suppressed. Consequently, an opening deformation that remains as a distortion after cooling may be prevented.

In the joining structure 20 according to the present exemplary embodiment, the gap F is formed between the seat portion 50 of the roof panel 24 and the flange portion 44B of the side panel outer 44. Therefore, splitting of an electric current during the spot welding of the shaft portion 36B of the rivet 36 to the roof side rail 22 (the side panel outer 44 and the like) may be suppressed. Thus, weld strength between the rivet 36 and the roof side rail 22 (the side panel outer 44 and the like) may be assured.

Ordinarily, if resistance welding (spot welding) is implemented when a panel of an aluminium alloy, CFRP or the like is being joined to a framework member formed of steel plate, because electrical conductivity of the panel of aluminium alloy, CFRP or the like is high, joining failures are caused by splitting of the current.

In contrast, in the joining structure 20 according to the present exemplary embodiment, because the gap F is formed between the seat portion 50 of the roof panel 24 and the flange portion 44B of the side panel outer 44, splitting of the current during the spot welding of the shaft portion 36B of the rivet 36 to the roof side rail 22 (the side panel outer 44 and the like) may be suppressed.

The gap F is formed between the seat portion 50 of the roof panel 24 and the flange portion 44B of the side panel outer 44, and the adhesive 56 is disposed inside the resin-filled portion 50B. Therefore, occurrences of corrosion due to electrochemical corrosion between the roof panel 24 and the roof side rail 22 (the side panel outer 44) that are formed of different materials may be suppressed.

Ordinarily, electrochemical corrosion that corrodes a material with a higher electric potential may occur in a region where heterogenous materials are in contact. However, in the present exemplary embodiment, because the adhesive 56 is disposed inside the resin-filled portion 50B, occurrences of corrosion due to electrochemical corrosion between the roof panel 24 and the roof side rail 22 (the side panel outer 44) may be suppressed.

A more uniform thickness of the adhesive 56 between the seat portion 50 and the flange portion 44B of of the side panel outer 44 may be assured by the resin-filled portion 50B. Thus, adhesion strength may be improved. That is, the adhesion strength of the adhesive 56 may be maximally deployed by the gap F being set to a dimension that may produce the maximum strength of the adhesive 56. In general, with the adhesive 56 for construction applications, a thickness of around 0.5 to 1.0 mm may bring about the maximum strength. Furthermore, because the adhesive 56 assuredly stays in the resin-filled portion 50B, a consistent sealing effect may be exhibited.

Because the sealant 54 is disposed inside the resin-filled portion 52A around the head portion 36A of the rivet 36, occurrences of corrosion due to electrochemical corrosion between the rivet 36 and roof panel 24 that are formed of different materials may be suppressed. Furthermore, because the resin-filled portion 52A is provided at the upper portion side of the seat portion 50, the sealant 54 assuredly stays in the resin-filled portion 52A and characteristics of an operation for application of the sealant 54 may be improved. That is, sealing quality may be improved by applying a large amount of the sealant 54 and leveling the upper surface of the sealant 54 by a spatula operation or suchlike.

The side panel outer 44 formed of steel plate is formed of a material with a lower linear expansion coefficient than the roof panel 24 formed of the aluminium alloy. Therefore, the roof panel 24 is easier to machine than the side panel outer 44. Consequently, the resin-filled portion 50B structured by the seat portion 50 and the resin-filled portion 52A structured by the two bead portions 52 are easy to form.

Because the bead portion 60 is in fluid communication with the resin-filled portion 50B, when the flange portion 24C of the roof panel 24 and the flange portion 44B of the side panel outer 44 are adhered by the adhesive 56 in the resin-filled portion 50B, excess adhesive 56 enters into the bead portion 60. Therefore, extrusion of the adhesive from between the seat portion 50 of the roof panel 24 and the flange portion 44B of the side panel outer 44 is suppressed.

Ordinarily, at a joining portion with area contact (touching), adhesive may be extruded, there may be a failure of adhesive joining, and corrosion may occur due to a failure of electrochemical corrosion prevention. In contrast, in the present exemplary embodiment, because the adhesive 56 stays in the bead portion 60, extrusion of the adhesive from between the seat portion 50 of the roof panel 24 and the flange portion 44B of the side panel outer 44 is suppressed. Therefore, occurrences of corrosion due to electrochemical corrosion between the roof panel 24 and the side panel outer 44 may be suppressed, and a sealing effect and reliable adhesion strength may be provided. Furthermore, because the adhesive 56 enters into the bead portion 60, the adhesive 56 may be prevented from flowing out due to flows of washing fluid, coating fluid and the like that occur in vats in a washing step, chemical conversion processing and electrodeposition coating in the painting process.

Thus, in the joining structure 20 according to the present exemplary embodiment, even though the roof panel 24 that is formed of a lightweight material is employed, the roof side rail 22 (the side panel outer 44 and the like) and the roof panel 24 may be reliably joined together by the rivet 36. Hence, effects of reducing fuel consumption and exhaust gases by reducing vehicle body weight may be improved, and handling stability may be improved by reducing the weight of components of the vehicle. In particular, because the roof panel 24 is a component that is at a higher position than the height of the center of gravity of the vehicle 10, handling stability may be even more effectively improved.

Second Exemplary Embodiment

Figure 6:
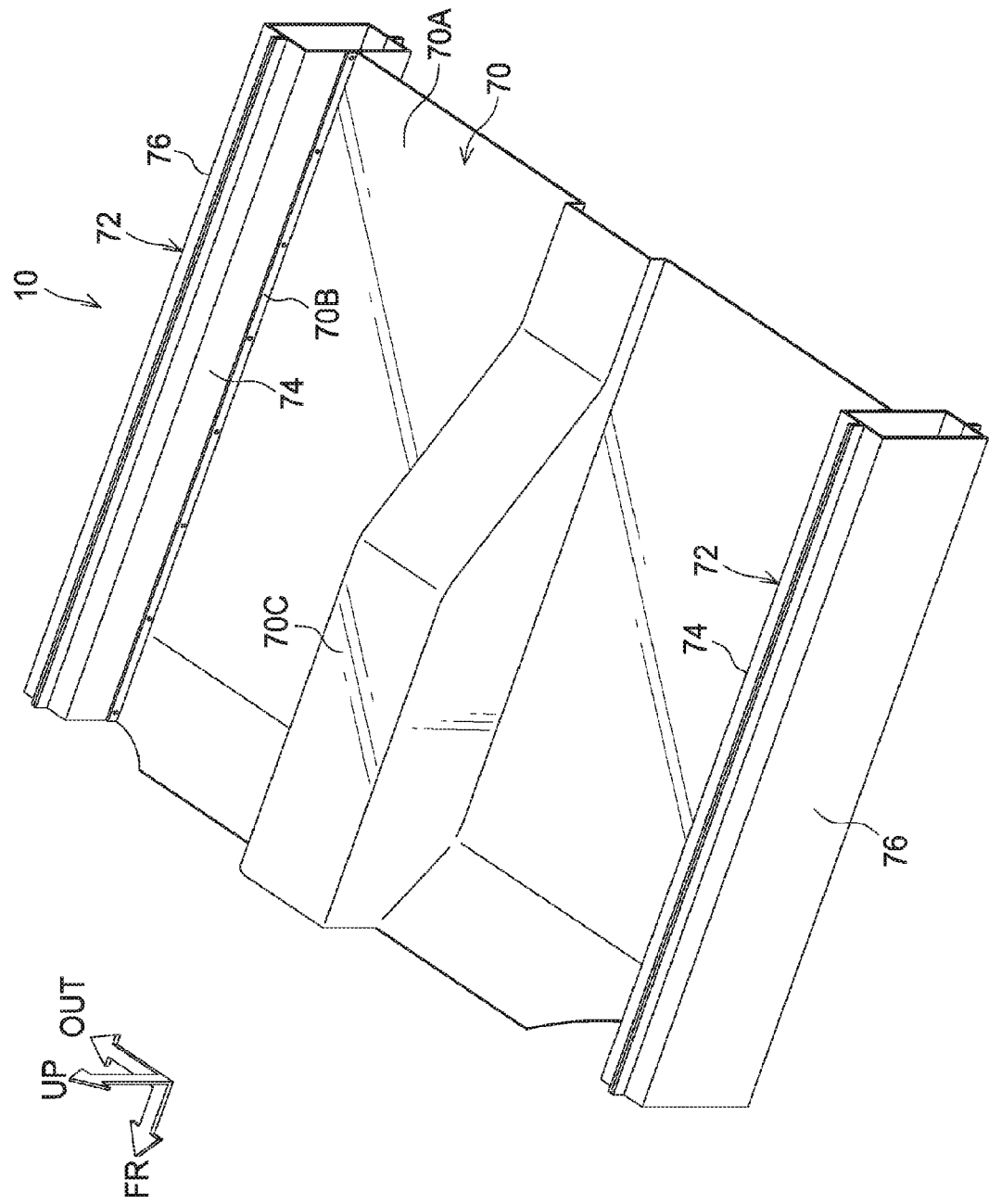
FIG. 6 is a perspective view showing a vicinity of a floor panel and rockers of a vehicle in which a joining structure in accordance with a second exemplary embodiment is employed.
Figure 7:
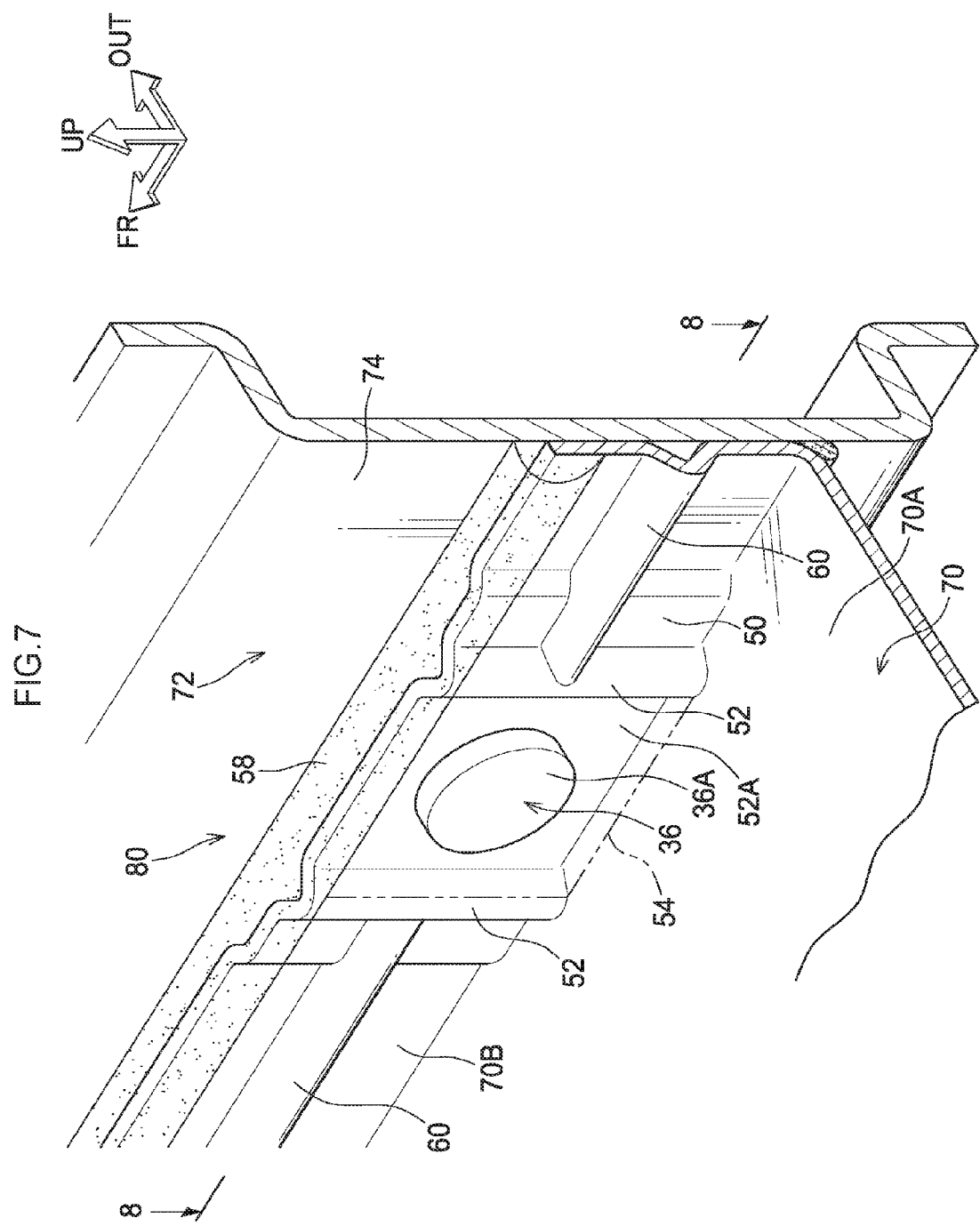
FIG. 7 is a perspective view showing a joining portion at which the floor panel and a rocker shown in FIG. 6 are joined by a rivet.
Figure 8:
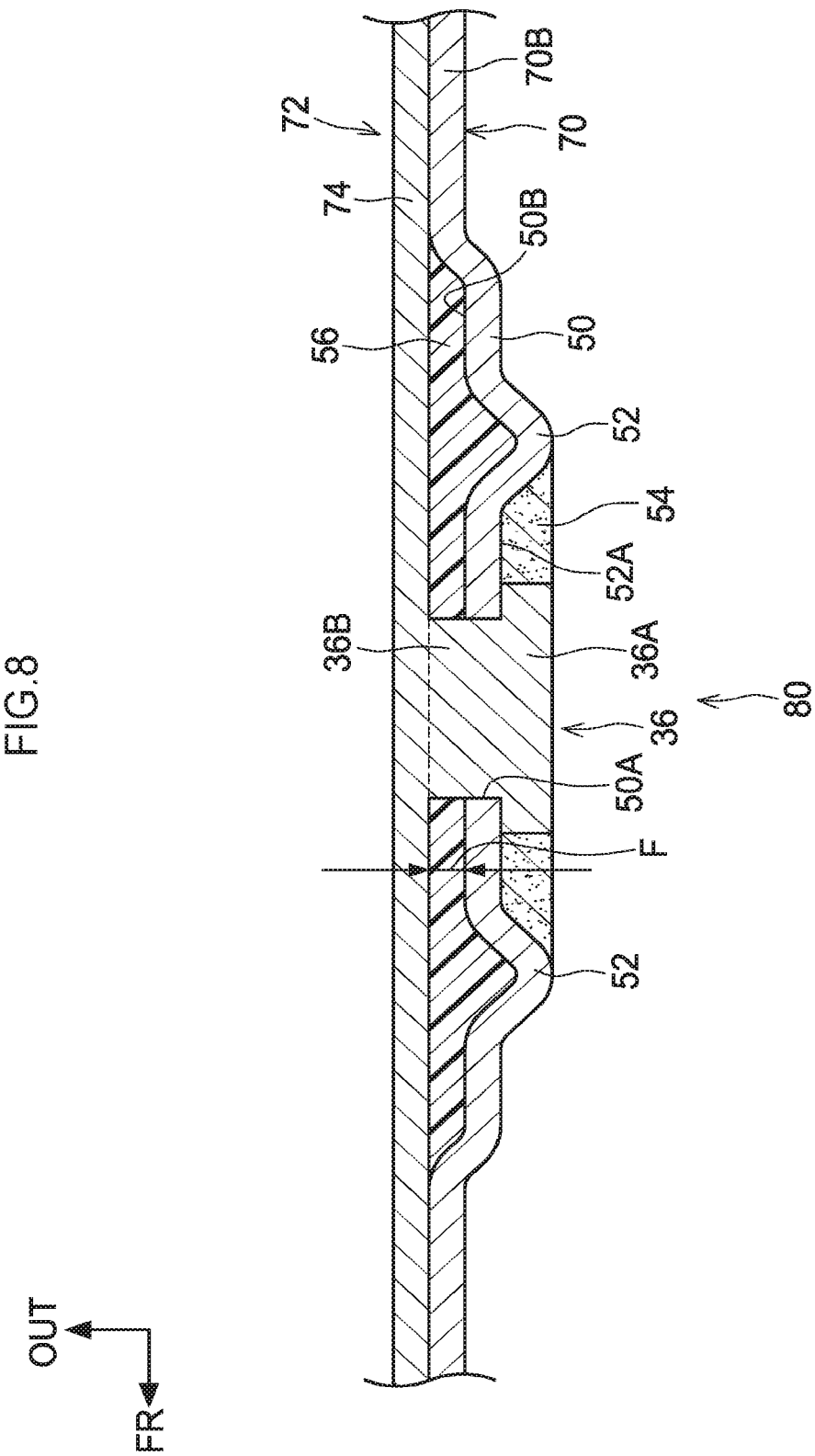
FIG. 8 is a sectional view showing the joining portion at which the floor panel and the rocker are joined by the rivet, taken along line 8-8 in FIG. 7.

Now, a second exemplary embodiment of the joining structure according to the present invention is described using FIG. 6 to FIG. 8. Structural elements, members and the like of the second exemplary embodiment that are the same as in the first exemplary embodiment are assigned the same reference numerals and are not described in detail.

As shown in FIG. 6, a floor panel 70 extends substantially in the vehicle width direction and substantially in the vehicle front-and-rear direction at a lower portion of the vehicle 10. The floor panel 70 serves as the first member. A rocker 72 extends in the vehicle front-and-rear direction at both of vehicle width direction end portions of the floor panel 70.

Each rocker 72 is provided with a rocker inner panel 74 disposed at the vehicle width direction inner side and a rocker outer panel 76 disposed at the vehicle width direction outer side of the rocker inner panel 74. The rocker inner panel 74 serves as the second member. In a cross section taken in the vehicle width direction (viewed in the vehicle front-and-rear direction), the rocker inner panel 74 is formed in a hat shape in cross section, the vehicle width direction outer side of which is open (see FIG. 7). In the cross section taken in the vehicle width direction, the rocker outer panel 76 is formed in a hat shape in cross section, the vehicle width direction inner side of which is open. The rocker inner panel 74 and rocker outer panel 76 are joined together by pairs of upper and lower flange portions thereof being welded or the like. Hence, the rocker inner panel 74 and rocker outer panel 76 form a closed cross section.

A flange portion 70B is formed at each of the two vehicle width direction end portions of the floor panel 70. The flange portion 70B is extended to the vehicle upper side from a general portion (wall portion) 70A that extends substantially in the vehicle front-and-rear direction and substantially in the vehicle width direction. The flange portion 70B is joined to the rocker inner panel 74. A tunnel portion 70C is provided at a vehicle width direction central portion of the floor panel 70. The tunnel portion 70C extends substantially in the vehicle front-and-rear direction.

As shown in FIG. 7 and FIG. 8, a joining structure 80 according to the present exemplary embodiment is employed at a joining portion between the flange portion 70B at the vehicle width direction outer side of the floor panel 70 and the rocker inner panel 74 of the rocker 72. Similarly to the first exemplary embodiment, the seat portion 50 is formed at the flange portion 70B of the floor panel 70 in order to form a gap between the flange portion 70B and the rocker inner panel 74. The two bead portions 52 are formed to protrude to the vehicle width direction inner side at the vehicle front side and vehicle rear side of the rivet 36, which penetrates through the seat portion 50. The sealant 54 is applied into the resin-filled portion 52A sandwiched between the two bead portions 52.

The seat portion 50 of the floor panel 70 forms the gap F between the floor panel 70 and the rocker inner panel 74, and the adhesive 56 is applied into the resin-filled portion 50B provided at the vehicle width direction outer side of the seat portion 50 (see FIG. 8).

In the joining structure 80 according to the present exemplary embodiment, the shaft portion 36B of the rivet 36 penetrates through the penetrating hole 50A in the seat portion 50 of the floor panel 70, and the distal end of the shaft portion 36B of the rivet 36 is joined to the rocker inner panel 74 by spot welding (see FIG. 8).

The floor panel 70 is formed of a lightweight material (a material such as a CFRP, an aluminium alloy, a magnesium alloy or the like). In the present exemplary embodiment, as an example, the floor panel 70 is formed of a CFRP. The rocker inner panel 74 is formed of steel plate. The rivet 36 is fabricated of steel, the same as the material that constitutes the rocker inner panel 74.

In this joining structure 80, the two bead portions 52 are provided at the flange portion 70B of the floor panel 70 as far as the general portion 70A of the floor panel 70, which is substantially perpendicular to the flange portion 70B. Therefore, the stiffness and strength of a joining surface of the flange portion 70B at which the rivet 36 is attached may be improved, and an occurrence of thermal distortion in a high-temperature environment due to a difference in linear expansion coefficients between the floor panel 70 and the rocker inner panel 74 may be suppressed.

The bead portions 60 are provided at the flange portion 70B of the floor panel 70 so as to connect between adjacent rivets 36 (not shown in the drawings). Thus, stiffness and strength between the joining rivets 36 may be improved. Therefore, an occurrence of thermal distortion in a high-temperature environment due to the difference in linear expansion coefficients between the floor panel 70 and the rocker inner panel 74 may be more assuredly suppressed.

Because the gap F is formed between the flange portion 70B and the rocker inner panel 74, splitting of the electric current during spot welding of the shaft portion 36B of the rivet 36 to the rocker inner panel 74 is suppressed. Thus, weld strength between the rivet 36 and the rocker inner panel 74 may be assured.

Because the adhesive 56 is applied to the inside of the resin-filled portion 50B, occurrences of corrosion due to electrochemical corrosion between the floor panel 70 and rocker inner panel 74 that are formed of different materials may be suppressed. Because the sealant 54 is disposed inside the resin-filled portion 52A around the head portion 36A of the rivet 36, occurrences of corrosion due to electrochemical corrosion between the rivet 36 and the flange portion 70B of the floor panel 70 that are formed of different materials may be suppressed.

Third Exemplary Embodiment

Figure 9:
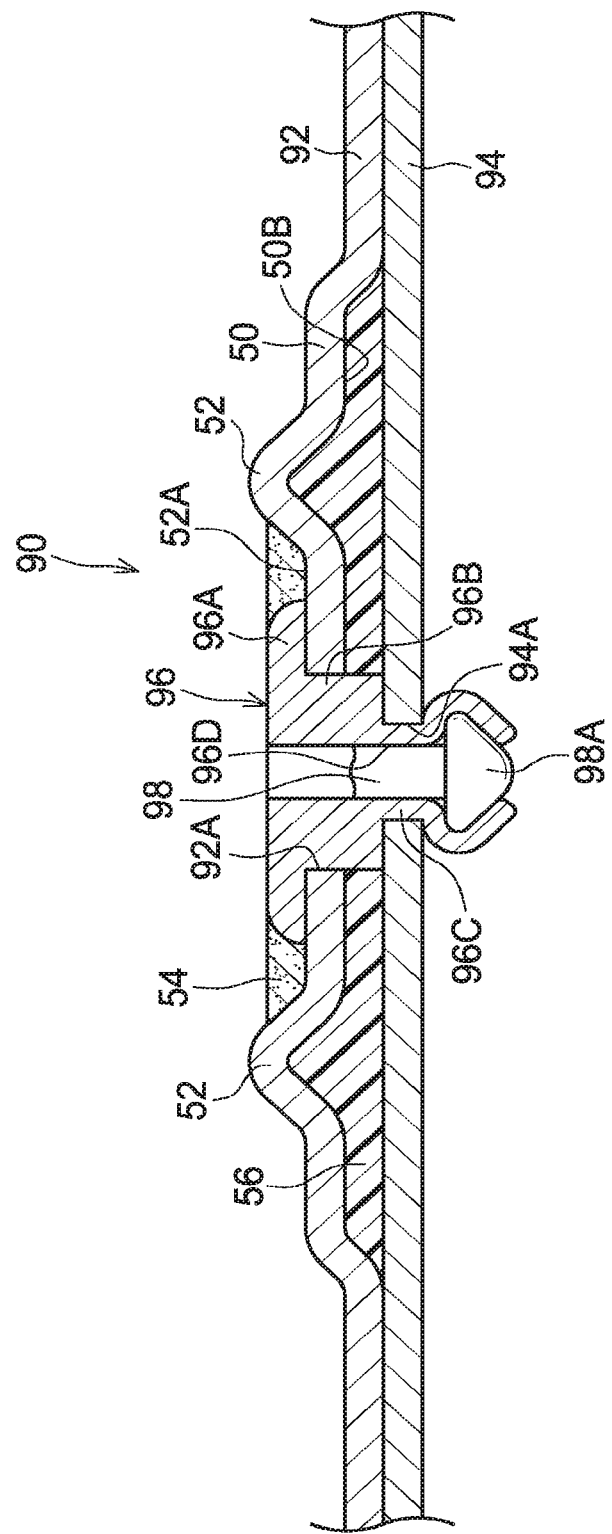
FIG. 9 is a sectional view showing a joining portion at which two panels are joined by a rivet, at which a joining structure in accordance with a third exemplary embodiment is employed.
Figure 10:
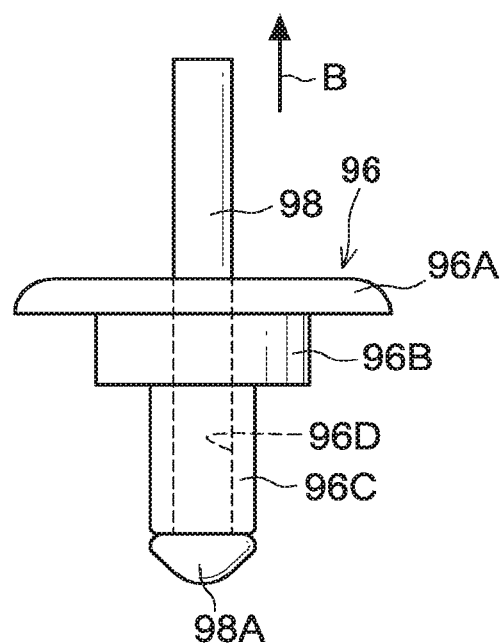
FIG. 10 is a side view showing the rivet before the joining shown in FIG. 9.

Now, a third exemplary embodiment of the joining structure according to the present invention is described using FIG. 9 and FIG. 10. Structural elements, members and the like of the third exemplary embodiment that are the same as in the first and second exemplary embodiments are assigned the same reference numerals and are not described in detail.

As shown in FIG. 9, a joining structure 90 according to the present exemplary embodiment is provided with a first panel 92 that serves as the first member, a second panel 94 that serves as the second member, and a rivet 96 that joins the first panel 92 and second panel 94 together. The first panel 92 is formed of the first material (for example, a lightweight material such as CFRP, an aluminium alloy or the like). The second panel 94 is formed of the second material that is different from the first material (for example, steel plate, CFRP, an aluminium alloy or the like). Which part of a vehicle the joining structure 90 is employed at is not limited and may be selected as appropriate.

As shown in FIG. 10, the rivet 96 is provided with a head portion 96A, a first shaft portion 96B with a large diameter that is adjacent to the head portion 96A, and a second shaft portion 96C with a small diameter that is adjacent to the first shaft portion 96B. A hole portion 96D is formed in a central portion of the rivet 96. A rod 98 is inserted through the inside of the hole portion 96D. An engaging portion 98A with a substantially triangular shape is provided at a distal end of the rod 98.

As shown in FIG. 9, a penetrating hole 92A is formed in the first panel 92. The first shaft portion 96B of the rivet 96 penetrates through the penetrating hole 92A. A penetrating hole 94A is formed in the second panel 94. The second shaft portion 96C of the rivet 96 penetrates through the penetrating hole 94A.

When the first panel 92 and second panel 94 are to be joined, the first shaft portion 96B of the rivet 96 is caused to penetrate through the penetrating hole 92A in the first panel 92 and the second shaft portion 96C of the rivet 96 is caused to penetrate through the penetrating hole 94A in the second panel 94. In this state, the rod 98 is pulled in the opposite direction to the second shaft portion 96C (is pulled in the direction of arrow B in FIG. 10) by a riveter, which is not shown in the drawings. That is, the engaging portion 98A of the rod 98 is pulled into the hole portion 96D by the riveter, and the distal end of the second shaft portion 96C is crushed and bucked. Thus, the first panel 92 and the second panel 94 are joined together.

Thus, in the joining structure 90, the first panel 92 and second panel 94 may be joined without the rivet 96 being welded to the second panel 94. Therefore, there is no need to limit the material of the second panel 94 to metals.

Fourth Exemplary Embodiment

Figure 11:
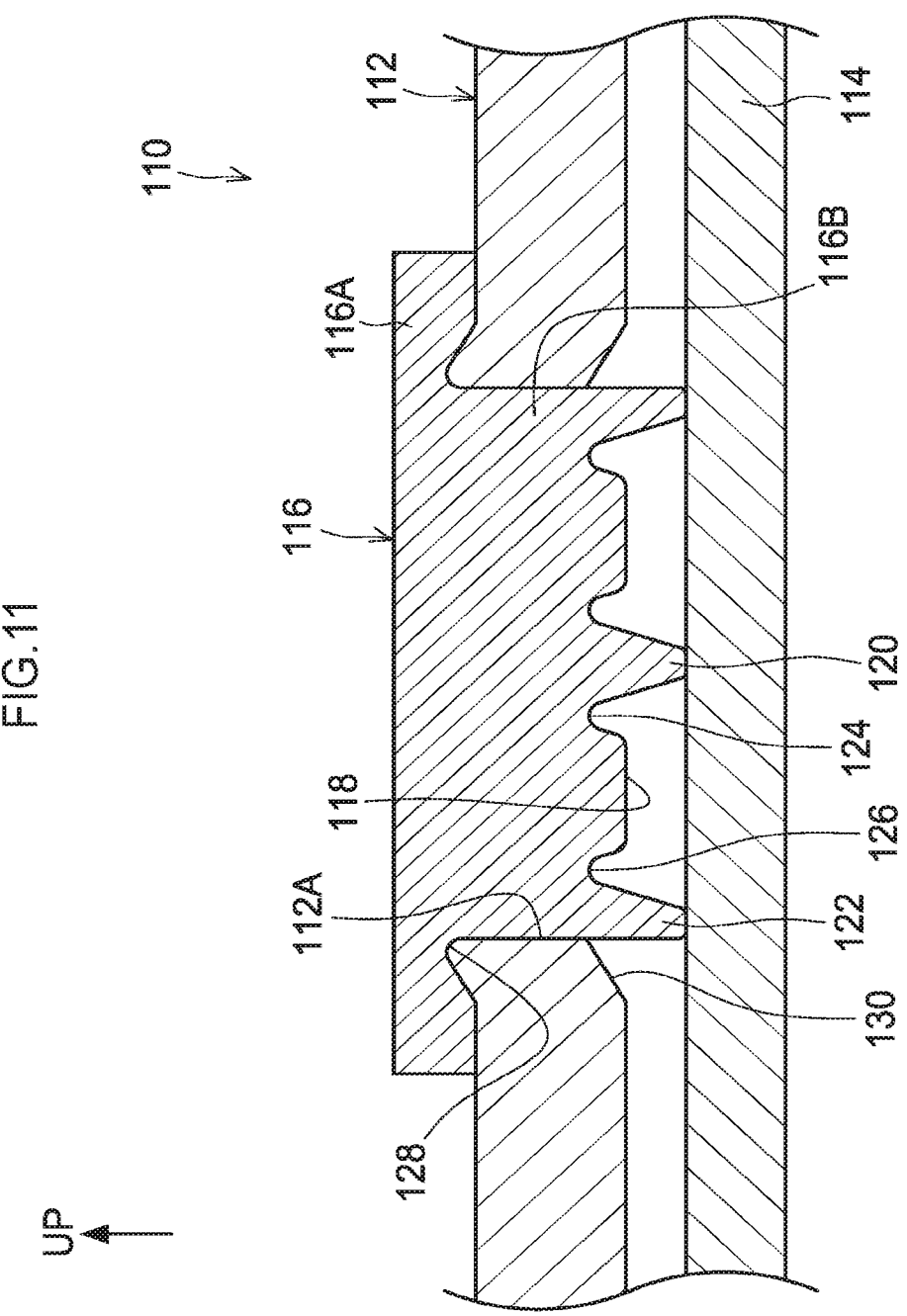
FIG. 11 is a sectional view showing a vicinity of a joining portion at which a first panel and a second panel are joined by a rivet, at which a joining structure in accordance with a fourth exemplary embodiment is employed, showing a state before the joining.
Figure 12:
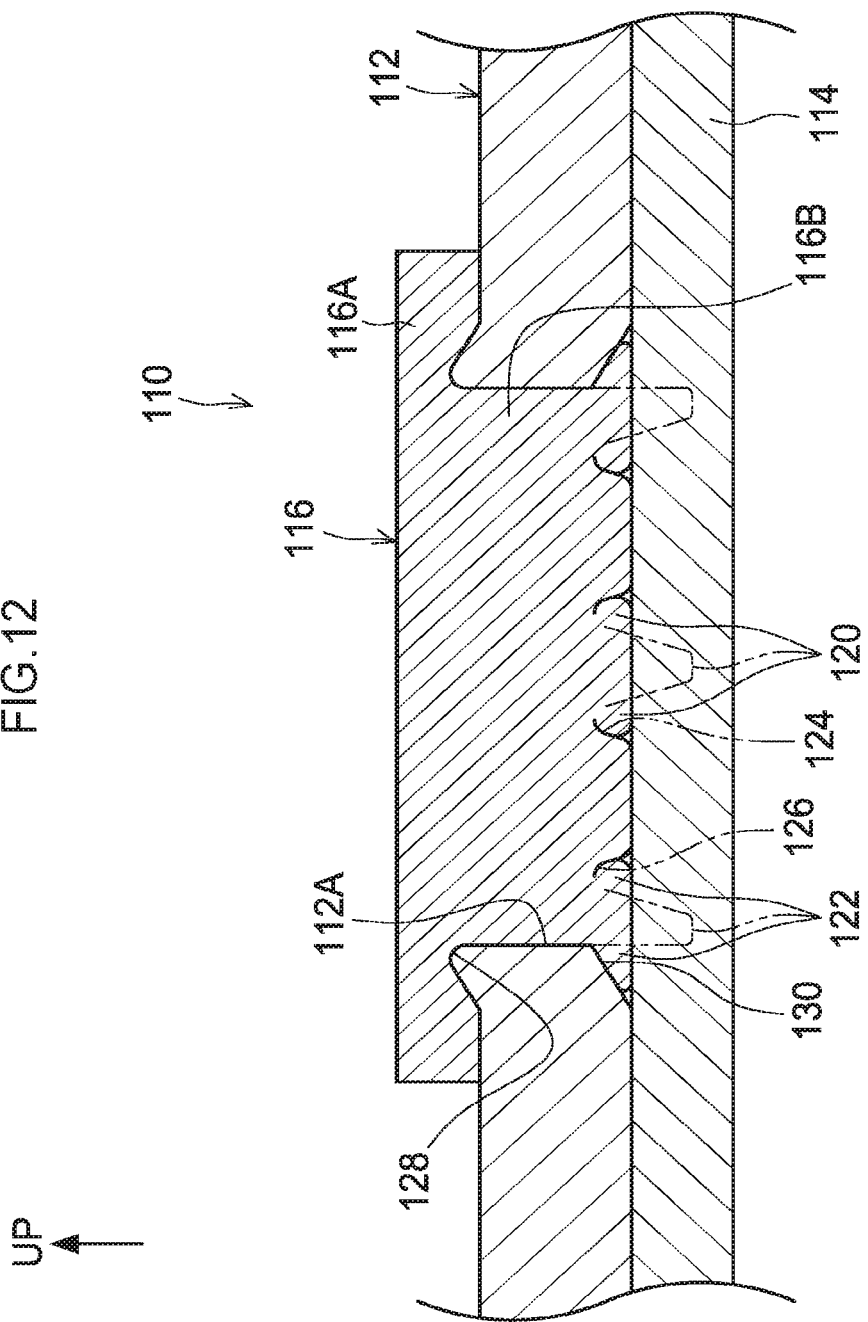
FIG. 12 is a sectional view showing the vicinity of the joining portion at which the first panel and second panel are joined by the rivet, at which the joining structure in accordance with the fourth exemplary embodiment is employed, showing a state after the joining.

Now, a fourth exemplary embodiment of the joining structure according to the present invention is described using FIG. 11 and FIG. 12. Structural elements, members and the like of the fourth exemplary embodiment that are the same as in the first to third exemplary embodiments are assigned the same reference numerals and are not described in detail. The arrow UP that is shown as appropriate in the drawings indicates the vehicle upper side.

As shown in FIG. 11, a joining structure 110 according to the present exemplary embodiment is provided with a first panel 112 that serves as the first member, a second panel 114 that serves as the second member, and a rivet 116 that joins the first panel 112 and second panel 114 together. The first panel 112 is formed of the first material (for example, a lightweight material such as CFRP, an aluminium alloy or the like). The second panel 114 is formed of the second material that is different from the first material (for example, steel plate or the like). Which part of a vehicle the joining structure 110 is employed at is not limited and may be selected as appropriate.

As shown in FIG. 11, the rivet 116 is provided with a head portion 116A and a shaft portion 116B. In the present exemplary embodiment, in a plan view (viewed in the downward direction of FIG. 11), the head portion 116A and shaft portion 116B are formed in substantially circular shapes. The rivet 116 is provided with at least two protrusion portions 120 and 122 at a surface 118 of the shaft portion 116B that opposes the second panel 114. The protrusion portions 120 and 122 protrude towards the second panel 114. The protrusion portion 120 is provided at a central portion of the surface 118 of the shaft portion 116B that opposes the second panel 114. The protrusion portion 122 is provided at a periphery edge portion of the surface 118 of the shaft portion 116B that opposes the second panel 114. In the present exemplary embodiment, in the plan view (viewed in the downward direction in FIG. 11), the protrusion portion 122 is continuously formed in a substantially circular shape along the periphery direction of the shaft portion 116B. However, instead of this structure, plural protrusion portions may be formed non-continuously along the periphery direction of the shaft portion.

The rivet 116 is provided with a recess portion 124 at a location of the surface 118 opposing the second panel 114 that is adjacent to the protrusion portion 120. The recess portion 124 is sunken in the direction away from the second panel 114. In the present exemplary embodiment, in the plan view (viewed in the downward direction in FIG. 11), the recess portion 124 is continuously provided in a substantially circular shape around the protrusion portion 120 at the central portion.

The rivet 116 is also provided with a recess portion 126 at a location of the surface 118 opposing the second panel 114 that is adjacent to the protrusion portion 122. The recess portion 126 is sunken in the direction away from the second panel 114. In the present exemplary embodiment, in the plan view (viewed in the downward direction in FIG. 11), the recess portion 126 is continuously provided in a substantially circular shape at the radial direction inner side of the protrusion portion 122 at the periphery edge portion.

The rivet 116 is further provided with a trough portion 128 at a location of the head portion 116A that is adjacent to the shaft portion 116B (i.e., a proximal portion of the shaft portion 116B). The trough portion 128 is sunken in the direction away from the second panel 114. In the present exemplary embodiment, in the plan view (viewed in the downward direction in FIG. 11), the trough portion 128 is continuously formed in a substantially circular shape at the periphery of the shaft portion 116B.

In the present exemplary embodiment, the first panel 112 is formed of an aluminium alloy. The first panel 112 that is applied is, for example, a member that has a large area and little influence on strength in relation to collisions, durability and the like, or the like.

In the present exemplary embodiment, the second panel 114 is formed of steel plate. The second panel 114 that is applied is, for example, a framework member that requires strength in relation to collisions, durability and the like, or the like. The second panel 114 is formed of a material with a lower linear expansion coefficient than the material that constitutes the first panel 112.

In the present exemplary embodiment, the rivet 116 is fabricated of steel, the same as the material that constitutes the second panel 114. The material of the rivet 116 is not limited thus; the rivet 116 may be formed of a material that is different from the material that constitutes the second panel 114.

As shown in FIG. 11, the shaft portion 116B of the rivet 116 penetrates through the penetrating hole 112A of the first panel 112. In the present exemplary embodiment, the first panel 112 is supported from the lower side thereof by a substantially circular tube-shaped die, and the shaft portion 116B of the rivet 116 is driven in by a pressing step, a welding step or the like. Thus, the shaft portion 116B of the rivet 116 pierces through the first panel 112 and, while penetrating through the first panel 112, opens up a penetrating hole 112A (a self-piercing process). At this time, a recessed trough 130 is formed by the die in the first panel 112 around the shaft portion 116B, and material of the first panel 112 that is being pressed (the aluminium alloy) flows into the trough portion 128 of the rivet 116. That is, pressed portions of the first panel 112 enter the trough portion 128 in the rivet 116. Thus, a fitting force between the rivet 116 and the first panel 112 is improved.

In the present exemplary embodiment, in the state in which the shaft portion 116B of the rivet 116 penetrates through the penetrating hole 112A of the first panel 112, the surface 118 at the side of the rivet 116 that is driven in is specified to be at substantially the same position as (coplanar with) a lower face of the first panel 112 (the face that is at the opposite side thereof from the side at which the head portion 116A is disposed).

In this state in which the shaft portion 116B of the rivet 116 penetrates through the penetrating hole 112A of the first panel 112, the distal end of the shaft portion 116B of the rivet 116 (i.e., the protrusion portions 120 and 122) is in contact with an upper face of the second panel 114. In this state, the shaft portion 116B of the rivet 116 is joined to the second panel 114 by welding (spot welding). In the state in which the protrusion portions 120 and 122 of the rivet 116 are in contact with the upper face of the second panel 114, a gap is provided between the surface 118 of the rivet 116 (and the lower face of the first panel 112) and the upper face of the second panel 114. In the present exemplary embodiment, this gap is set to, for example, 0.2 to 0.5 mm, and preferably 0.2 to 0.3 mm. However, this range is not limiting.

When the spot welding is being carried out, one spot welding electrode (the upper side spot welding gun) is abutted against the head portion 116A of the rivet 116, and the other spot welding electrode (the lower side spot welding gun) is abutted against the lower face of the second panel 114. In this state, current flows through the pair of spot welding electrodes.

As illustrated in FIG. 12, during the spot welding of the joining structure 110 according to the present exemplary embodiment, melting starts from the protrusion portions 120 and 122 provided at the shaft portion 116B of the rivet 116. That is, the protrusion portions 120 and 122 of the shaft portion 116B melt locally and substantially uniformly as a whole. At this time, the molten protrusion portion 120 flows into the recess portion 124 of the rivet 116 that is adjacent thereto, and the molten protrusion portion 122 flows into the recess portion 126 of the rivet 116 that is adjacent thereto. Consequently, a weld area between the shaft portion 116B of the rivet 116 and the second panel 114 may be enlarged.

In addition, the molten protrusion portion 122 flows into the recessed trough 130 of the first panel 112 that is adjacent thereto. Therefore, during the welding of the shaft portion 116B of the rivet 116 to the second panel 114, regions into which molten portions of the rivet 116 enter may be increased. Thus, the shaft portion 116B and the second panel 114 may be joined together more stably. Moreover, a fitting force (holding force) of the first panel 112 by the rivet 116 may be increased by portions of the rivet 116 that have entered the recessed trough 130. Finally, the upper face of the second panel 114 is put into area contact with the lower face of the first panel 112. In the state in which the shaft portion 116B of the rivet 116 has been joined to the second panel 114 by the welding, the head portion 116A of the rivet 116 touches the first panel 112 (see FIG. 12). Thus, the first panel 112 and the second panel 114 are joined together by the rivet 116.

In this joining structure 110, because the two protrusion portions 120 and 122 are provided projecting towards the second panel 114 at the surface 118 of the rivet 116 that opposes the second panel 114, when the shaft portion 116B of the rivet 116 and the second panel 114 are being joined by the spot welding, melting starts from the protrusion portions 120 and 122. Therefore, an occurrence of a joining failure between the rivet 116 and the second panel 114 in association with local unevenness of heat at a single spot may be suppressed.

During the spot welding of this joining structure 110, even if the center of the spot welding electrode (the spot welding gun) is offset from the center of the rivet 116, the protrusion portions 120 and 122 provided at the shaft portion 116B of the rivet 116 melt locally and substantially uniformly as a whole. Therefore, off-center melting of the rivet and twisting of the rivet in a direction intersecting the axial direction thereof may be prevented or suppressed. Consequently, a decrease in weld strength, distortion of the first panel 112 or the second panel 114, and the formation of flash due to twisting of the rivet may be suppressed.

Figure 15:
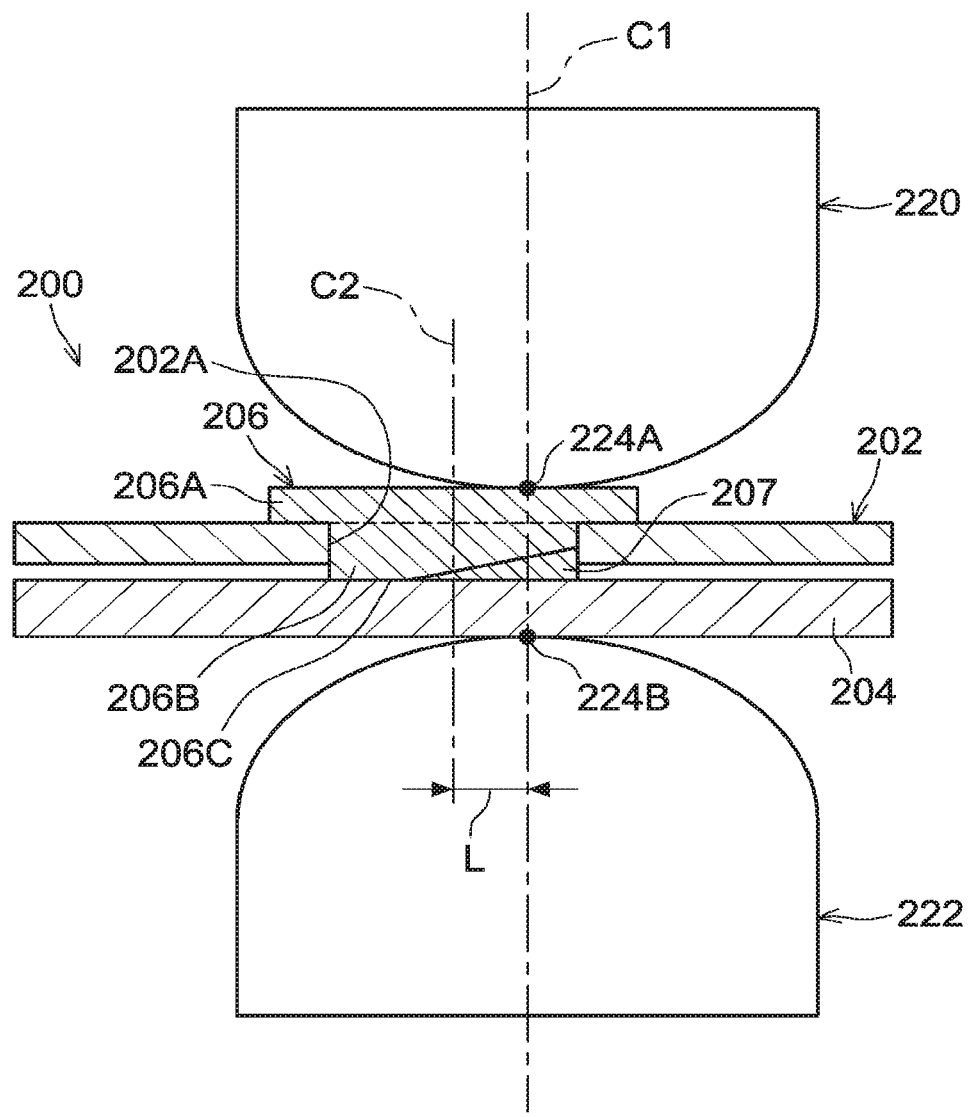
FIG. 15 is a sectional view showing a vicinity of a joining portion at which a first panel and a second panel are joined by a rivet, at which a joining structure in accordance with a comparative example is employed, showing a process of joining.

FIG. 15 and FIG. 16 show a joining structure 200 according to a comparative example in sectional views. As shown in FIG. 15, the joining structure 200 is provided with a first panel 202 formed of a first material (for example, a lightweight material such as an aluminium alloy or the like), a second panel 204 formed of a second material that is different from the first material (for example, steel plate or the like), and a rivet 206 that joins the first panel 202 and second panel 204 together. The rivet 206 is provided with a head portion 206A and a shaft portion 206B.

The shaft portion 206B of the rivet 206 is caused to penetrate through a penetrating hole 202A in the first panel 202 by being driven in by a pressing step or a welding step. When the shaft portion 206B of the rivet 206 is being driven into the first panel 202, the rivet 206 itself pierces through the first panel 202 and drives out scrap (chaff) of a hole portion of the first panel 202 (the penetrating hole) while opening up the hole portion (the self-piercing technique). Therefore, in this structure a length of the shaft portion 206B of the rivet 206 in the axial direction thereof is longer then a thickness of the first panel 202, and the distal end of the shaft portion 206B pierces beyond the first panel 202.

As shown in FIG. 15, in the state in which the shaft portion 206B of the rivet 206 penetrates through the penetrating hole 202A of the first panel 202, an end face 206C of the shaft portion 206B is in contact with the second panel 204, and the shaft portion 206B and second panel 204 are joined together by spot welding. At this time, one spot welding electrode (spot welding gun) 220 is abutted against the head portion 206A of the rivet 206 and another spot welding electrode (spot welding gun) 222 is abutted against the lower face of the second panel 204, and current flows through the spot welding electrodes 220 and 222. Distal ends of the spot welding electrodes 220 and 222 are formed with curved surfaces that project in protrusion shapes.

In FIG. 15, a center C1 of the spot welding electrodes 220 and 222 and a center C2 of the rivet 206 are offset. In this comparative example, the center C1 of the spot welding electrodes 220 and 222 and the center C2 of the rivet 206 are offset by a distance L. At this time, a large current flows along the shortest distance between a point 224A at which the spot welding electrode 220 touches the head portion 206A and a point 224B at which the spot welding electrode 222 touches the second panel 204. As a result, the rivet 206 melts off center. That is, portions of the shaft portion 206B of the rivet 206 that are closer to the center C1 of the spot welding electrodes 220 and 222 are more prone to melting (see a melting portion 207 in FIG. 15). In FIG. 15, the melting portion 207 is shown schematically in order to aid understanding.

Consequently, as shown in FIG. 16, the rivet 206 twists in a direction intersecting the axial direction thereof (in the direction of arrow D), a distortion is produced in the first panel 202, and flash 208 is produced at a portion of the first panel 202 into which the head portion 206A bites. When a distortion in the first panel 202 occurs, a distortion may be produced in a design surface of the first panel 202. Moreover, because the end face of the shaft portion 206B of the rivet 206 melts locally and the welding is implemented over a small area, a decrease in weld strength may result.

In contrast, in the joining structure 110 according to the present exemplary embodiment, even if the center of the spot welding electrodes is offset from the center of the rivet 116, melting starts from the protrusion portions 120 and 122 provided at the shaft portion 116B of the rivet 116. Therefore, off-center melting of the rivet and twisting of the rivet may be prevented or suppressed. Thus, a decrease in weld strength, a distortion of the first panel 112 or the second panel 114, and the production of flash may be suppressed.

In the joining structure 110 according to the present exemplary embodiment, a resin-filled portion is not provided between the first panel and the second panel as in the first to third exemplary embodiments. However, even when there is no resin-filled portion, because the melting starts from the protrusion portions 120 and 122 of the rivet 116, effects are provided in that a decrease in weld strength, distortion of the first panel 112 or the second panel 114 (including thermal distortion), and the production of flash may be suppressed.

Fifth Exemplary Embodiment

Figure 13:
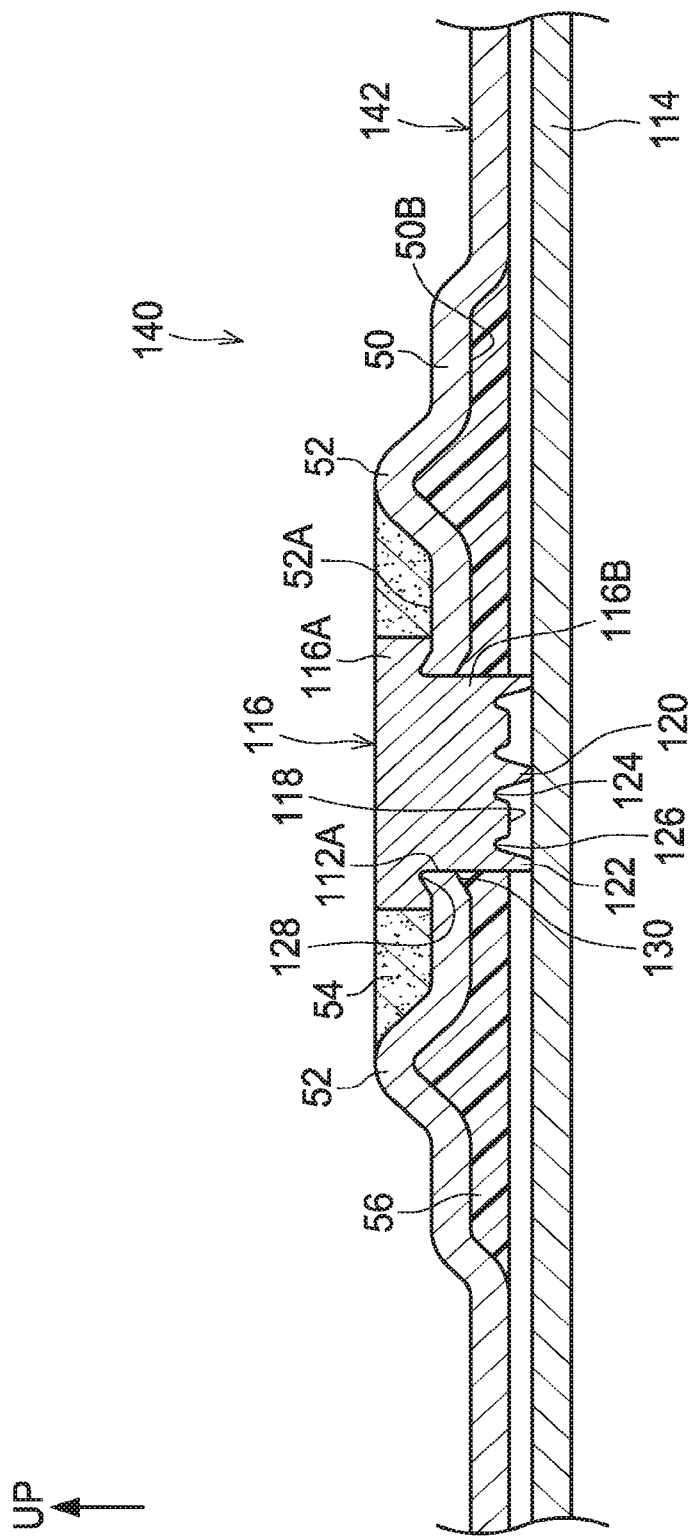
FIG. 13 is a sectional view showing a vicinity of a joining portion at which a first panel and a second panel are joined by a rivet, at which a joining structure in accordance with a fifth exemplary embodiment is employed, showing a state before the joining.
Figure 14:
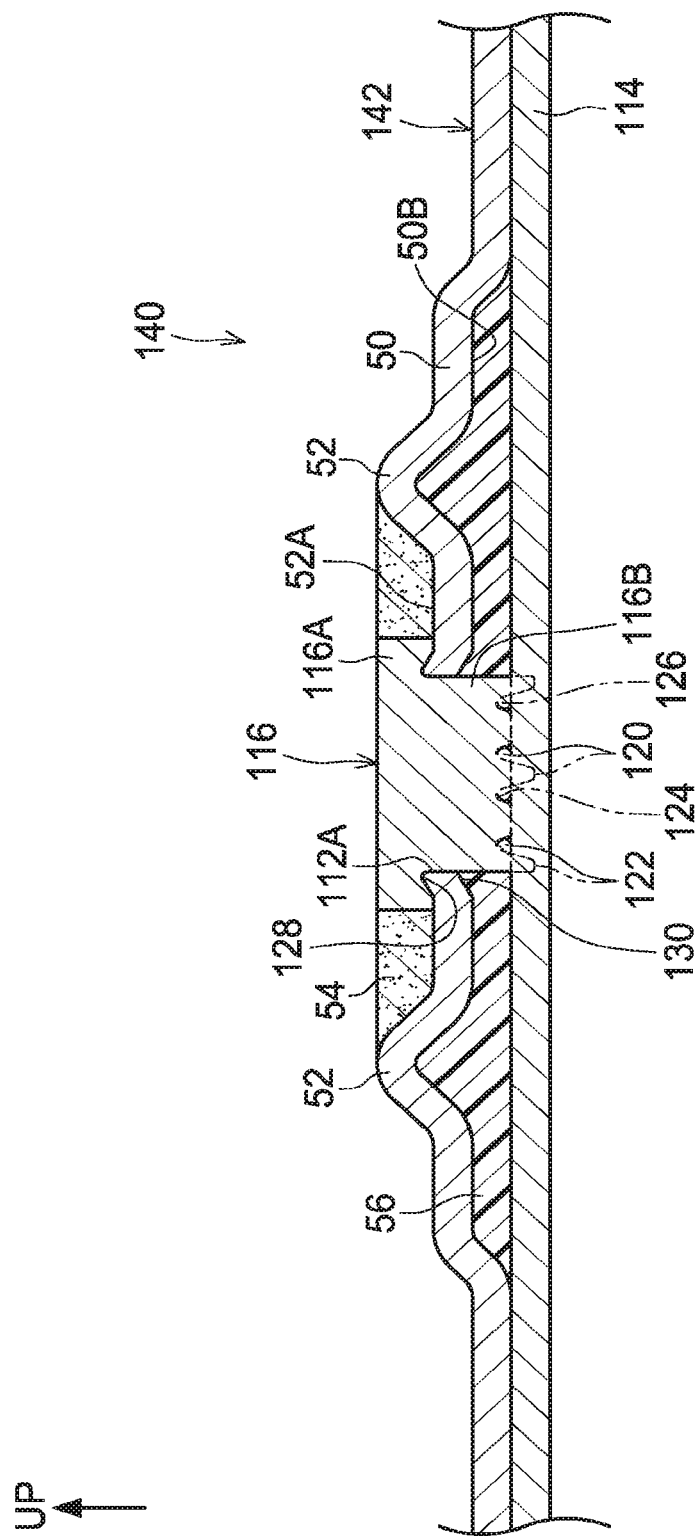
FIG. 14 is a sectional view showing the vicinity of the joining portion at which the first panel and second panel are joined by the rivet, at which the joining structure in accordance with the fifth exemplary embodiment is employed, showing a state after the joining.

Now, a fifth exemplary embodiment of the joining structure according to the present invention is described using FIG. 13 and FIG. 14. Structural elements, members and the like of the fifth exemplary embodiment that are the same as in the first to fourth exemplary embodiments are assigned the same reference numerals and are not described in detail.

As shown in FIG. 13, a joining structure 140 according to the present exemplary embodiment is provided with a first panel 142 that serves as the first member, the second panel 114 that serves as the second member, and the rivet 116 that joins the first panel 142 and second panel 114 together. The first panel 142 is formed of the first material (for example, a lightweight material such as CFRP, an aluminium alloy or the like). The second panel 114 is formed of the second material that is different from the first material (for example, steel plate or the like). Which part of a vehicle the joining structure 140 is employed at is not limited and may be selected as appropriate.

At the first panel 142, similarly to the first exemplary embodiment, the seat portion 50 is formed in order to form a gap between the first panel 142 and the second panel 114. The shaft portion 116B of the rivet 116 penetrates through the penetrating hole 112A of the seat portion 50. At the seat portion 50, the two bead portions 52 are formed to protrude to the vehicle upper side at both sides of a direction intersecting the axial direction of the rivet 116. The shapes of the two bead portions 52 are the same as in the first exemplary embodiment (see FIG. 4). The sealant 54 is applied into the resin-filled portion 52A sandwiched between the two bead portions 52. The sealant 54 is applied around the head portion 116A of the rivet 116.

The seat portion 50 of the first panel 142 forms the gap between the first panel 142 and the second panel 114, and the adhesive 56 is applied into the resin-filled portion 50B that is provided at the vehicle lower side of the seat portion 50. In FIG. 13, the structures of the resin-filled portion 50B and the adhesive 56 are shown schematically in order to aid understanding. In FIG. 13, the shaft portion 116B of the rivet 116 is not yet joined to the second panel 114. However, because the adhesive 56 has a certain level of viscosity, the adhesive 56 stays inside the resin-filled portion 50B even if the surface of the adhesive 56 is oriented to the vehicle lower side. In the present exemplary embodiment, the adhesive 56 is filled until, for example, a position of the surface thereof is substantially the same as a position of the lower face of the first panel 142.

The rivet 116 is provided with the protrusion portion 120 and the protrusion portion 122 at the surface 118 of the shaft portion 116B that opposes the second panel 114. The protrusion portion 120 is disposed at the central portion of the surface 118 and the protrusion portion 122 is disposed at the periphery edge portion of the surface 118. The recess portion 124 is provided at the surface 118 of the rivet 116 that opposes the second panel 114, around the protrusion portion 120 at the central portion, and the recess portion 126 is provided at the surface 118 along the protrusion portion 122 at the radial direction inner side of the protrusion portion 122 at the periphery edge portion.

In the joining structure 140 according to the present exemplary embodiment, in the state in which the shaft portion 116B of the rivet 116 penetrates through the penetrating hole 112A of the seat portion 50 of the first panel 142, the distal end of the shaft portion 116B of the rivet 116 is joined to the second panel 114 by spot welding (see FIG. 14).

As illustrated in FIG. 14, during the spot welding, melting starts from the protrusion portions 120 and 122 provided at the shaft portion 116B of the rivet 116. That is, the protrusion portions 120 and 122 melt locally and substantially uniformly as a whole. The molten protrusion portion 120 flows into the recess portion 124 of the rivet 116 that is adjacent thereto, and the molten protrusion portion 122 flows into the recess portion 126 of the rivet 116 that is adjacent thereto. Consequently, a weld area between the shaft portion 116B of the rivet 116 and the second panel 114 may be enlarged.

At the radial direction outer side of the protrusion portion 122, because the adhesive 56 is applied into the resin-filled portion 50B, the molten protrusion portion 122 flows to the side thereof at which the adhesive 56 is disposed and may press the adhesive 56 to the side thereof at which the recessed trough 130 of the first panel 142 is disposed. Therefore, during the welding of the distal end of the shaft portion 116B of the rivet 116 to the second panel 114, regions into which molten portions of the rivet 116 enter may be increased. Thus, the shaft portion 116B and second panel 114 may be joined together more stably. In the state in which the shaft portion 116B of the rivet 116 has been joined to the second panel 114 by the welding, the upper face of the second panel 114 is in area contact with the lower face of the first panel 142, and the head portion 116A of the rivet 116 touches the first panel 142.

In the joining structure 140 according to the present exemplary embodiment, when the shaft portion 116B of the rivet 116 and the second panel 114 are being joined by the spot welding, melting starts from the protrusion portions 120 and 122 of the shaft portion 116B. Therefore, an occurrence of a joining failure between the rivet 116 and the second panel 114 in association with local unevenness of heat at a single spot may be suppressed.

Moreover, even if the center of the spot welding electrodes is offset from the center of the rivet 116, the protrusion portions 120 and 122 of the shaft portion 116B melt locally and substantially uniformly as a whole. Therefore, off-center melting of the rivet and twisting of the rivet in a direction intersecting the axial direction thereof may be prevented or suppressed. Thus, a decrease in weld strength, distortion of the first panel 142 or the second panel 114, and the production of flash may be suppressed.

Because the gap is formed between the seat portion 50 of the first panel 142 and the second panel 114, splitting of the electric current during the spot welding of the shaft portion 116B of the rivet 116 to the second panel 114 is suppressed. Thus, weld strength between the rivet 116 and the second panel 114 may be more assuredly improved.

Because the adhesive 56 is applied to the interior of the resin-filled portion 50B, occurrences of corrosion due to electrochemical corrosion between the first panel 142 and second panel 114 that are formed of different materials may be suppressed. Because the sealant 54 is provided inside the resin-filled portion 52A around the head portion 116A of the rivet 116, occurrences of corrosion due to electrochemical corrosion between the rivet 116 and second panel 114 that are formed of different materials may also be suppressed.

In the first and second exemplary embodiments, the joining structure is applied to a joining portion between a roof panel and left and right roof side rails of a vehicle, or to a joining portion between a floor panel and left and right rockers of a vehicle. However, the present invention is not limited to these structures. That is, the joining structure may be applied to a joining portion between two panels at an alternative part of the vehicle.

In the first to third exemplary embodiments and the fifth exemplary embodiment, the resin-filled portion is formed by a seat portion at the first member (the roof panel, floor panel or first panel), but the present invention is not limited thus. For example, the resin-filled portion may be formed at the second member (the roof side rail, rocker or second panel), or may be formed at both the first member and the second member.

As long as the first member and the second member are formed of different materials, the materials are not limited to the materials recited in the first to fifth exemplary embodiments but may be modified to alternative materials. That is, the present invention may be applied in cases in which both the first member and the second member are metals, one of the first member and the second member is a metal and the other is a resin, or both the first member and the second member are resins.

In the fourth and fifth exemplary embodiments, the protrusion portions 120 and 122 are provided at the central portion and the periphery edge portion of the surface 118 of the shaft portion 116B that opposes the second panel 114, but the present invention is not limited thus. As long as two or more protrusion portions are provided at the surface of the shaft portion of the rivet that opposes the second panel, positions and numbers of the protrusion portions may be modified.

Furthermore, positions and numbers of the recess portions may be modified in accordance with the positions and numbers of the protrusion portions. In these cases, it is preferable if the recess portions are provided at positions adjacent to the protrusion portions.

In the fourth and fifth exemplary embodiments, the recess portion 124 is provided at a location adjacent to the protrusion portion 120 and the recess portion 126 is provided at a location adjacent to the protrusion portion 122 but the present invention is not limited to these structures. For example, the recess portion 124 may be disposed slightly apart from the protrusion portion 120 and the recess portion 126 may be disposed slightly apart from the protrusion portion 122.

The disclosures of Japanese Patent Application No. 2013-147766 are incorporated into the present specification by reference in their entirety.

All references, patent applications and technical specifications cited in the present specification are incorporated by reference into the present specification to the same extent as if the individual references, patent applications and technical specifications were specifically and individually recited as being incorporated by reference.

The invention claimed is:

1. A joining structure comprising:
a first member formed of a first material;
a second member formed of a second material that is different from the first material;
a rivet that penetrates through at least the first member and joins the first member and the second member together; and
a resin-filled portion provided around the rivet at a side of the first member on which the second member is disposed, the resin-filled portion being formed by at least one of the first member and the second member and forming a gap between the first member and the second member, and a resin member being disposed inside the resin-filled portion, wherein
the first member and the second member are engaged with each other outside the resin-filled portion,
the second material is formed of a metal material,
the rivet includes a head portion that touches the first member and a shaft portion that penetrates through the first member, and
the shaft portion is joined to the second member by welding.

2. A joining structure comprising:
a first member formed of a first material:
a second member formed of a second material that is different from the first material;
a rivet that penetrates through at least the first member and joins the first member and the second member together; and
a resin-filled portion provided around the rivet at a side of the first member at which the second member is disposed, the resin-filled portion being formed by at least one of the first member and the second member and forming a gap between the first member and the second member, and a resin member being disposed inside the resin-filled portion, wherein
the second material is formed of a metal material,
the rivet includes a head portion that touches the first member and a shaft portion that penetrates through the first member,
the shaft portion is joined to the second member by welding, and
another resin-filled portion is provided around the rivet at an opposite side of the first member from the side thereof at which the second member is disposed, a resin member being disposed inside the another resin-filled portion.

3. The joining structure according to claim 1, wherein the second member is formed of a material with a lower linear expansion coefficient than the first member.

4. The joining structure according to claim 1, wherein the resin member that is disposed in the resin-filled portion is an adhesive.

5. The joining structure according to claim 2, wherein
a flange portion that is inflected from a wall portion of the first member is joined to the second member by the rivet,
the another resin-filled portion is formed by a bead portion at the flange portion, and
the bead portion is provided as far as a boundary region of the flange portion with the wall portion.

6. The joining structure according to claim 5, further comprising:
a plurality of rivets that each penetrate through at least the first member and joins the first member and the second member together, and
wherein another bead portion is provided so as to connect between the plurality rivets, the another bead portion being in fluid communication with the resin-filled portion.

7. The joining structure according to claim 1, wherein at least two protrusion portions are provided at a surface of the rivet that opposes the second member, the protrusion portions protruding toward the second member.

8. The joining structure according to claim 7, wherein a recess portion is provided at the surface of the rivet that opposes the second member, the recess portion being provided at a location adjacent to the protrusion portions, the recess portion being sunken in a direction away from the second member.

9. The joining structure according to claim 7, wherein the protrusion portions are provided at a central portion and a periphery edge portion of the surface of the rivet that opposes the second member.

10. The joining structure according to claim 1, wherein a trough portion is provided at the head portion, the trough portion being provided at a location adjacent to the shaft portion, the trough portion being sunken in a direction away from the second member.

* * * * *